US009891881B2

(12) United States Patent  
Sheen et al.

(10) Patent No.: US 9,891,881 B2
(45) Date of Patent: Feb. 13, 2018

(54) AUDIO PROCESSING ALGORITHM DATABASE

(71) Applicant: Sonos, Inc., Santa Barbara, CA (US)

(72) Inventors: Timothy W. Sheen, Brighton, MA (US); Simon Jarvis, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 44 days.

(21) Appl. No.: 14/481,514

(22) Filed: Sep. 9, 2014

(65) Prior Publication Data

US 2016/0070525 A1   Mar. 10, 2016

(51) Int. Cl.
G06F 17/00 (2006.01)
G06F 3/16 (2006.01)
G05B 15/02 (2006.01)
H04S 7/00 (2006.01)

(52) U.S. Cl.
CPC ............ G06F 3/165 (2013.01); G05B 15/02 (2013.01); H04S 7/307 (2013.01)

(58) Field of Classification Search
CPC ....... G06F 3/165; H04R 27/00; H04R 29/007; H04R 2227/005; H04S 7/307
See application file for complete search history.

(56) References Cited

U.S. PATENT DOCUMENTS 4,306,113 A   12/1981   Morton
4,342,104 A   7/1982    Jack
4,504,704 A   3/1985    Ohyaba et al.
(Continued)

FOREIGN PATENT DOCUMENTS

EP   0772374 A2   5/1997
EP   1133896 B1   8/2002
(Continued)

OTHER PUBLICATIONS

""Constellation Acoustic System: a revolutionary breakthrough in acoustical design" Meyer Sound Laboratories, Inc., <http://www.meyersound.com/pdf/brochures/constellation_brochure_c.pdf> 2012, 32 pages".

(Continued)

Primary Examiner — Fan Tsang
Assistant Examiner — David Siegel
(74) Attorney, Agent, or Firm — McDonnell Boehnen Hulbert & Berghoff LLP

(57) ABSTRACT

Examples described herein involve maintaining a database of audio processing algorithms. Maintaining the database may involve generating or updating audio processing algorithm entries. In one example, generating an audio processing algorithm may involve a computing device causing a playback device to play a first audio signal in a playback zone, receiving (i) data indicating one or more characteristics of a playback zone, and (ii) data indicating a second audio signal detected by a microphone of the playback device in the playback zone. Based on the second audio signal and a characteristic of the playback device, an audio processing algorithm may be determined. The an association between the determined audio processing algorithm at least one of the one or more characteristics of the playback zone may be stored in the database.

20 Claims, 10 Drawing Sheets

(56) References Cited

U.S. PATENT DOCUMENTS

| | | |
|---|---|---|
| 4,592,088 A | 5/1986 | Shimada |
| 4,631,749 A | 12/1986 | Rapaich |
| 4,694,484 A | 9/1987 | Atkinson et al. |
| 4,773,094 A | 9/1988 | Dolby |
| 4,995,778 A | 2/1991 | Brussel |
| 5,218,710 A | 6/1993 | Yamaki et al. |
| 5,255,326 A | 10/1993 | Stevenson |
| 5,323,257 A | 6/1994 | Abe et al. |
| 5,386,478 A | 1/1995 | Plunkett |
| 5,440,644 A | 8/1995 | Farinelli et al. |
| 5,553,147 A | 9/1996 | Pineau |
| 5,581,621 A | 12/1996 | Koyama et al. |
| 5,761,320 A | 6/1998 | Farinelli et al. |
| 5,910,991 A | 6/1999 | Farrar |
| 5,923,902 A | 7/1999 | Inagaki |
| 5,939,656 A | 8/1999 | Suda |
| 6,018,376 A | 1/2000 | Nakatani |
| 6,032,202 A | 2/2000 | Lea et al. |
| 6,072,879 A | 6/2000 | Ouchi et al. |
| 6,111,957 A | 8/2000 | Thomasson |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,573,067 B1 | 6/2003 | Dib-Hajj et al. |
| 6,611,537 B1 | 8/2003 | Edens et al. |
| 6,631,410 B1 | 10/2003 | Kowalski et al. |
| 6,639,989 B1 | 10/2003 | Zacharov et al. |
| 6,643,744 B1 | 11/2003 | Cheng |
| 6,704,421 B1 | 3/2004 | Kitamura |
| 6,721,428 B1 | 4/2004 | Allred et al. |
| 6,757,517 B2 | 6/2004 | Chang |
| 6,766,025 B1 | 7/2004 | Levy et al. |
| 6,778,869 B2 | 8/2004 | Champion |
| 6,798,889 B1 | 9/2004 | Dicker et al. |
| 6,862,440 B2 | 3/2005 | Sampath |
| 6,916,980 B2 | 7/2005 | Ishida et al. |
| 6,931,134 B1 | 8/2005 | Waller, Jr. et al. |
| 6,985,694 B1 | 1/2006 | De Bonet et al. |
| 6,990,211 B2 | 1/2006 | Parker |
| 7,039,212 B2 | 5/2006 | Poling et al. |
| 7,058,186 B2 | 6/2006 | Tanaka |
| 7,072,477 B1 | 7/2006 | Kincaid |
| 7,103,187 B1 | 9/2006 | Neuman |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,289,637 B2 | 10/2007 | Montag et al. |
| 7,295,548 B2 | 11/2007 | Blank et al. |
| 7,312,785 B2 | 12/2007 | Tsuk et al. |
| 7,477,751 B2 | 1/2009 | Lyon et al. |
| 7,483,538 B2 | 1/2009 | McCarty et al. |
| 7,483,540 B2 | 1/2009 | Rabinowitz et al. |
| 7,489,784 B2 | 2/2009 | Yoshino |
| 7,490,044 B2 | 2/2009 | Kulkarni |
| 7,492,909 B2 | 2/2009 | Carter et al. |
| 7,519,188 B2 | 4/2009 | Berardi et al. |
| 7,529,377 B2 | 5/2009 | Nackvi et al. |
| 7,571,014 B1 | 8/2009 | Lambourne et al. |
| 7,590,772 B2 | 9/2009 | Marriott et al. |
| 7,630,500 B1 | 12/2009 | Beckman et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,664,276 B2 | 2/2010 | McKee Cooper |
| 7,676,044 B2 | 3/2010 | Sasaki et al. |
| 7,689,305 B2 | 3/2010 | Kreifeldt et al. |
| 7,742,740 B2 | 6/2010 | Goldberg et al. |
| 7,769,183 B2 | 8/2010 | Bharitkar et al. |
| 7,796,068 B2 | 9/2010 | Raz et al. |
| 7,835,689 B2 | 11/2010 | Goldberg et al. |
| 7,853,341 B2 | 12/2010 | McCarty et al. |
| 7,925,203 B2 | 4/2011 | Lane et al. |
| 7,949,140 B2 | 5/2011 | Kino |
| 7,949,707 B2 | 5/2011 | McDowall et al. |
| 7,961,893 B2 | 6/2011 | Kino |
| 7,987,294 B2 | 7/2011 | Bryce et al. |
| 8,005,228 B2 | 8/2011 | Bharitkar et al. |
| 8,014,423 B2 | 9/2011 | Thaler et al. |
| 8,045,721 B2 | 10/2011 | Burgan et al. |
| 8,045,952 B2 | 10/2011 | Qureshey et al. |
| 8,050,652 B2 | 11/2011 | Qureshey et al. |
| 8,063,698 B2 | 11/2011 | Howard |
| 8,074,253 B1 | 12/2011 | Nathan |
| 8,103,009 B2 | 1/2012 | McCarty et al. |
| 8,116,476 B2 | 2/2012 | Inohara |
| 8,126,172 B2 | 2/2012 | Horbach et al. |
| 8,131,390 B2 | 3/2012 | Braithwaite et al. |
| 8,139,774 B2 | 3/2012 | Berardi et al. |
| 8,144,883 B2 | 3/2012 | Pedersen |
| 8,160,276 B2 | 4/2012 | Liao et al. |
| 8,160,281 B2 | 4/2012 | Kim et al. |
| 8,170,260 B2 | 5/2012 | Reining et al. |
| 8,175,292 B2 | 5/2012 | Aylward et al. |
| 8,175,297 B1 | 5/2012 | Ho et al. |
| 8,194,874 B2 | 6/2012 | Starobin et al. |
| 8,229,125 B2 | 7/2012 | Short |
| 8,233,632 B1 | 7/2012 | MacDonald |
| 8,234,395 B2 | 7/2012 | Millington |
| 8,238,547 B2 | 8/2012 | Ohki et al. |
| 8,238,578 B2 | 8/2012 | Aylward |
| 8,243,961 B1 | 8/2012 | Morrill |
| 8,265,310 B2 | 9/2012 | Berardi et al. |
| 8,270,620 B2 | 9/2012 | Christensen |
| 8,279,709 B2 | 10/2012 | Choisel et al. |
| 8,281,001 B2 | 10/2012 | Busam et al. |
| 8,290,185 B2 | 10/2012 | Kim |
| 8,291,349 B1 | 10/2012 | Park et al. |
| 8,300,845 B2 | 10/2012 | Zurek et al. |
| 8,306,235 B2 | 11/2012 | Mahowald |
| 8,325,931 B2 | 12/2012 | Howard et al. |
| 8,325,935 B2 | 12/2012 | Rutschman |
| 8,331,585 B2 | 12/2012 | Hagen et al. |
| 8,332,414 B2 | 12/2012 | Nguyen et al. |
| 8,379,876 B2 | 2/2013 | Zhang |
| 8,391,501 B2 | 3/2013 | Khawand et al. |
| 8,401,202 B2 | 3/2013 | Brooking |
| 8,433,076 B2 | 4/2013 | Zurek et al. |
| 8,452,020 B2 | 5/2013 | Gregg et al. |
| 8,463,184 B2 | 6/2013 | Dua |
| 8,483,853 B1 | 7/2013 | Lambourne |
| 8,488,799 B2 | 7/2013 | Goldstein et al. |
| 8,503,669 B2 | 8/2013 | Mao |
| 8,527,876 B2 | 9/2013 | Wood et al. |
| 8,577,045 B2 | 11/2013 | Gibbs |
| 8,577,048 B2 | 11/2013 | Chaikin et al. |
| 8,600,075 B2 | 12/2013 | Lim |
| 8,620,006 B2 | 12/2013 | Berardi et al. |
| 8,731,206 B1 | 5/2014 | Park |
| 8,755,538 B2 | 6/2014 | Kwon |
| 8,819,554 B2 | 8/2014 | Basso et al. |
| 8,831,244 B2 | 9/2014 | Apfel |
| 8,855,319 B2 | 10/2014 | Liu et al. |
| 8,879,761 B2 | 11/2014 | Johnson et al. |
| 8,903,526 B2 | 12/2014 | Beckhardt et al. |
| 8,914,559 B2 | 12/2014 | Kalayjian et al. |
| 8,930,005 B2 | 1/2015 | Reimann |
| 8,934,647 B2 | 1/2015 | Joyce et al. |
| 8,934,655 B2 | 1/2015 | Breen et al. |
| 8,965,546 B2 | 2/2015 | Visser et al. |
| 8,977,974 B2 | 3/2015 | Kraut |
| 8,984,442 B2 | 3/2015 | Pirnack et al. |
| 8,989,406 B2 | 3/2015 | Wong et al. |
| 8,995,687 B2 | 3/2015 | Marino, Jr. et al. |
| 8,996,370 B2 | 3/2015 | Ansell |
| 9,020,153 B2 | 4/2015 | Britt, Jr. |
| 9,100,766 B2 | 8/2015 | Soulodre |
| 9,215,545 B2 | 12/2015 | Dublin et al. |
| 9,231,545 B2 | 1/2016 | Agustin et al. |
| 9,288,597 B2 | 3/2016 | Carlsson et al. |
| 9,300,266 B2 | 3/2016 | Grokop |
| 9,319,816 B1 | 4/2016 | Narayanan |

(56) References Cited

U.S. PATENT DOCUMENTS

| | | |
|---|---|---|
| 9,462,399 B2 | 10/2016 | Bharitkar et al. |
| 9,467,779 B2 | 10/2016 | Iyengar et al. |
| 9,472,201 B1 | 10/2016 | Sleator |
| 9,489,948 B1 | 11/2016 | Chu et al. |
| 9,538,305 B2 | 1/2017 | Lehnert et al. |
| 9,538,308 B2 | 1/2017 | Isaac et al. |
| 9,560,449 B2 | 1/2017 | Carlsson et al. |
| 9,560,460 B2 | 1/2017 | Chaikin et al. |
| 9,609,383 B1 | 3/2017 | Hirst |
| 9,615,171 B1 | 4/2017 | O'Neill et al. |
| 2001/0038702 A1 | 11/2001 | Lavoie et al. |
| 2001/0042107 A1 | 11/2001 | Palm |
| 2001/0043592 A1 | 11/2001 | Jimenez et al. |
| 2002/0022453 A1 | 2/2002 | Balog et al. |
| 2002/0026442 A1 | 2/2002 | Lipscomb et al. |
| 2002/0078161 A1 | 6/2002 | Cheng |
| 2002/0089529 A1 | 7/2002 | Robbin |
| 2002/0124097 A1 | 9/2002 | Isely et al. |
| 2003/0002689 A1 | 1/2003 | Folio |
| 2003/0157951 A1 | 8/2003 | Hasty |
| 2003/0161479 A1 | 8/2003 | Yang et al. |
| 2003/0179891 A1 | 9/2003 | Rabinowitz et al. |
| 2004/0024478 A1 | 2/2004 | Hans et al. |
| 2004/0237750 A1 | 12/2004 | Smith et al. |
| 2005/0031143 A1 | 2/2005 | Devantier et al. |
| 2005/0063554 A1 | 3/2005 | Devantier et al. |
| 2005/0147261 A1 | 7/2005 | Yeh |
| 2005/0157885 A1 | 7/2005 | Olney et al. |
| 2006/0008256 A1 | 1/2006 | Khedouri et al. |
| 2006/0026521 A1 | 2/2006 | Hotelling et al. |
| 2006/0032357 A1 | 2/2006 | Roovers et al. |
| 2006/0195480 A1 | 8/2006 | Spiegelman et al. |
| 2006/0225097 A1 | 10/2006 | Lawrence-Apfelbaum |
| 2007/0003067 A1 | 1/2007 | Gierl et al. |
| 2007/0032895 A1 | 2/2007 | Nackvi et al. |
| 2007/0038999 A1 | 2/2007 | Millington et al. |
| 2007/0086597 A1 | 4/2007 | Kino |
| 2007/0116254 A1 | 5/2007 | Looney et al. |
| 2007/0121955 A1 | 5/2007 | Johnston et al. |
| 2007/0142944 A1 | 6/2007 | Goldberg et al. |
| 2008/0002839 A1 | 1/2008 | Eng |
| 2008/0065247 A1 | 3/2008 | Igoe |
| 2008/0069378 A1 | 3/2008 | Rabinowitz et al. |
| 2008/0098027 A1 | 4/2008 | Aarts |
| 2008/0136623 A1 | 6/2008 | Calvarese |
| 2008/0144864 A1 | 6/2008 | Huon |
| 2008/0175411 A1 | 7/2008 | Greve |
| 2008/0232603 A1 | 9/2008 | Soulodre |
| 2008/0266385 A1 | 10/2008 | Smith et al. |
| 2009/0024662 A1 | 1/2009 | Park et al. |
| 2009/0047993 A1 | 2/2009 | Vasa |
| 2009/0063274 A1 | 3/2009 | Dublin, III et al. |
| 2009/0110218 A1 | 4/2009 | Swain |
| 2009/0138507 A1 | 5/2009 | Burckart et al. |
| 2009/0147134 A1 | 6/2009 | Iwamatsu |
| 2009/0196428 A1 | 8/2009 | Kim |
| 2009/0202082 A1 | 8/2009 | Bharitkar et al. |
| 2009/0252481 A1 | 10/2009 | Ekstrand |
| 2009/0304205 A1 | 12/2009 | Hardacker et al. |
| 2010/0128902 A1 | 5/2010 | Liu et al. |
| 2010/0135501 A1 | 6/2010 | Corbett et al. |
| 2010/0142735 A1 | 6/2010 | Yoon et al. |
| 2010/0146445 A1 | 6/2010 | Kraut |
| 2010/0162117 A1 | 6/2010 | Basso et al. |
| 2010/0189203 A1 | 7/2010 | Wilhelmsson et al. |
| 2010/0195846 A1 | 8/2010 | Yokoyama |
| 2010/0272270 A1 | 10/2010 | Chaikin et al. |
| 2010/0296659 A1 | 11/2010 | Tanaka |
| 2010/0303250 A1 | 12/2010 | Goldberg et al. |
| 2010/0323793 A1 | 12/2010 | Andall |
| 2011/0007904 A1 | 1/2011 | Tomoda et al. |
| 2011/0007905 A1 | 1/2011 | Sato et al. |
| 2011/0087842 A1 | 4/2011 | Lu et al. |
| 2011/0091055 A1 | 4/2011 | Leblanc |
| 2011/0170710 A1 | 7/2011 | Son |
| 2011/0234480 A1 | 9/2011 | Fino et al. |
| 2012/0032928 A1 | 2/2012 | Alberth et al. |
| 2012/0051558 A1 | 3/2012 | Kim et al. |
| 2012/0057724 A1* | 3/2012 | Rabinowitz ............ H04S 7/307 381/103 |
| 2012/0093320 A1 | 4/2012 | Flaks et al. |
| 2012/0127831 A1 | 5/2012 | Gicklhorn et al. |
| 2012/0140936 A1 | 6/2012 | Bonnick et al. |
| 2012/0148075 A1 | 6/2012 | Goh et al. |
| 2012/0183156 A1 | 7/2012 | Schlessinger et al. |
| 2012/0213391 A1 | 8/2012 | Usami et al. |
| 2012/0215530 A1 | 8/2012 | Harsch |
| 2012/0237037 A1 | 9/2012 | Ninan et al. |
| 2012/0243697 A1 | 9/2012 | Frye |
| 2012/0263325 A1 | 10/2012 | Freeman et al. |
| 2012/0268145 A1 | 10/2012 | Chandra et al. |
| 2012/0269356 A1 | 10/2012 | Sheerin et al. |
| 2012/0275613 A1 | 11/2012 | Soulodre |
| 2012/0283593 A1 | 11/2012 | Searchfield et al. |
| 2012/0288124 A1 | 11/2012 | Fejzo et al. |
| 2013/0010970 A1 | 1/2013 | Hegarty et al. |
| 2013/0028443 A1 | 1/2013 | Pance et al. |
| 2013/0051572 A1 | 2/2013 | Goh et al. |
| 2013/0066453 A1* | 3/2013 | Seefeldt ................ H04S 7/301 700/94 |
| 2013/0108055 A1 | 5/2013 | Hanna et al. |
| 2013/0129122 A1 | 5/2013 | Johnson et al. |
| 2013/0170647 A1 | 7/2013 | Reilly |
| 2013/0202131 A1 | 8/2013 | Kemmochi et al. |
| 2013/0211843 A1 | 8/2013 | Clarkson |
| 2013/0216071 A1 | 8/2013 | Maher et al. |
| 2013/0223642 A1 | 8/2013 | Warren et al. |
| 2013/0230175 A1 | 9/2013 | Bech et al. |
| 2013/0259254 A1 | 10/2013 | Xiang et al. |
| 2013/0279706 A1 | 10/2013 | Marti |
| 2013/0305152 A1 | 11/2013 | Griffiths et al. |
| 2013/0315405 A1 | 11/2013 | Kanishima et al. |
| 2013/0329896 A1 | 12/2013 | Krishnaswamy et al. |
| 2013/0331970 A1 | 12/2013 | Beckhardt et al. |
| 2014/0003622 A1 | 1/2014 | Ikizyan et al. |
| 2014/0003623 A1 | 1/2014 | Lang |
| 2014/0003625 A1 | 1/2014 | Sheen et al. |
| 2014/0003626 A1 | 1/2014 | Holman et al. |
| 2014/0006587 A1 | 1/2014 | Kusano |
| 2014/0016784 A1 | 1/2014 | Sen et al. |
| 2014/0016786 A1 | 1/2014 | Sen |
| 2014/0016802 A1 | 1/2014 | Sen |
| 2014/0023196 A1 | 1/2014 | Xiang et al. |
| 2014/0037097 A1 | 2/2014 | Labosco |
| 2014/0037107 A1 | 2/2014 | Marino, Jr. et al. |
| 2014/0052770 A1 | 2/2014 | Gran et al. |
| 2014/0064501 A1 | 3/2014 | Olsen et al. |
| 2014/0064550 A1 | 3/2014 | Wiggins |
| 2014/0079242 A1 | 3/2014 | Nguyen et al. |
| 2014/0084014 A1 | 3/2014 | Sim et al. |
| 2014/0112481 A1 | 4/2014 | Li et al. |
| 2014/0119551 A1 | 5/2014 | Bharitkar et al. |
| 2014/0126730 A1 | 5/2014 | Crawley et al. |
| 2014/0161265 A1 | 6/2014 | Chaikin et al. |
| 2014/0180684 A1 | 6/2014 | Strub |
| 2014/0192986 A1 | 7/2014 | Lee et al. |
| 2014/0219456 A1 | 8/2014 | Morrell et al. |
| 2014/0219483 A1 | 8/2014 | Hong |
| 2014/0226823 A1 | 8/2014 | Sen et al. |
| 2014/0242913 A1 | 8/2014 | Pang |
| 2014/0267148 A1 | 9/2014 | Luna et al. |
| 2014/0270202 A1 | 9/2014 | Ivanov et al. |
| 2014/0270282 A1 | 9/2014 | Tammi et al. |
| 2014/0273859 A1 | 9/2014 | Luna et al. |
| 2014/0279889 A1 | 9/2014 | Luna |
| 2014/0285313 A1 | 9/2014 | Luna et al. |
| 2014/0286496 A1 | 9/2014 | Luna et al. |
| 2014/0294200 A1 | 10/2014 | Baumgarte et al. |
| 2014/0310269 A1 | 10/2014 | Zhang et al. |
| 2014/0321670 A1 | 10/2014 | Nystrom et al. |
| 2014/0323036 A1 | 10/2014 | Daley et al. |
| 2014/0341399 A1 | 11/2014 | Dusse |
| 2014/0344689 A1 | 11/2014 | Scott et al. |
| 2014/0355768 A1 | 12/2014 | Sen et al. |

(56) References Cited

U.S. PATENT DOCUMENTS

| | | |
|---|---|---|
| 2014/0355794 A1 | 12/2014 | Morrell et al. |
| 2015/0011195 A1 | 1/2015 | Li |
| 2015/0016642 A1 | 1/2015 | Walsh et al. |
| 2015/0031287 A1 | 1/2015 | Pang et al. |
| 2015/0032844 A1 | 1/2015 | Tarr et al. |
| 2015/0036847 A1 | 2/2015 | Donaldson |
| 2015/0036848 A1 | 2/2015 | Donaldson |
| 2015/0043736 A1 | 2/2015 | Olsen et al. |
| 2015/0063610 A1 | 3/2015 | Mossner |
| 2015/0078586 A1 | 3/2015 | Ang et al. |
| 2015/0078596 A1 | 3/2015 | Sprogis |
| 2015/0100991 A1 | 4/2015 | Risberg et al. |
| 2015/0146886 A1 | 5/2015 | Baumgarte |
| 2015/0149943 A1 | 5/2015 | Nguyen et al. |
| 2015/0201274 A1 | 7/2015 | Ellner et al. |
| 2015/0208184 A1 | 7/2015 | Tan et al. |
| 2015/0229699 A1 | 8/2015 | Liu |
| 2015/0271616 A1 | 9/2015 | Kechichian |
| 2015/0281866 A1 | 10/2015 | Williams et al. |
| 2015/0289064 A1 | 10/2015 | Jensen et al. |
| 2015/0382128 A1 | 12/2015 | Ridihalgh et al. |
| 2016/0007116 A1 | 1/2016 | Holman |
| 2016/0011846 A1 | 1/2016 | Sheen |
| 2016/0014509 A1 | 1/2016 | Hansson et al. |
| 2016/0014511 A1 | 1/2016 | Sheen et al. |
| 2016/0014534 A1 | 1/2016 | Sheen |
| 2016/0014536 A1 | 1/2016 | Sheen |
| 2016/0021458 A1 | 1/2016 | Johnson et al. |
| 2016/0021473 A1 | 1/2016 | Riggi et al. |
| 2016/0021481 A1 | 1/2016 | Johnson et al. |
| 2016/0029142 A1 | 1/2016 | Isaac |
| 2016/0037277 A1 | 2/2016 | Matsumoto et al. |
| 2016/0073210 A1 | 3/2016 | Sheen |
| 2016/0140969 A1 | 5/2016 | Srinivasan et al. |
| 2016/0165297 A1 | 6/2016 | Jamal-Syed et al. |
| 2016/0192098 A1 | 6/2016 | Oishi et al. |
| 2016/0192099 A1 | 6/2016 | Oishi et al. |
| 2016/0260140 A1 | 9/2016 | Shirley et al. |
| 2016/0309276 A1 | 10/2016 | Ridihalgh et al. |
| 2016/0313971 A1 | 10/2016 | Bierbower et al. |
| 2016/0316305 A1 | 10/2016 | Sheen et al. |
| 2016/0330562 A1 | 11/2016 | Crockett |
| 2016/0366517 A1 | 12/2016 | Chandran et al. |
| 2017/0086003 A1 | 3/2017 | Rabinowitz et al. |
| 2017/0105084 A1 | 4/2017 | Holman |
| 2017/0142532 A1 | 5/2017 | Pan |

FOREIGN PATENT DOCUMENTS

| | | |
|---|---|---|
| EP | 1389853 A1 | 2/2004 |
| EP | 2043381 A2 | 4/2009 |
| EP | 1349427 B1 | 12/2009 |
| EP | 2161950 A2 | 3/2010 |
| EP | 2194471 A1 | 6/2010 |
| EP | 2197220 A2 | 6/2010 |
| EP | 2429155 A1 | 3/2012 |
| EP | 1825713 B1 | 10/2012 |
| EP | 2591617 B1 | 6/2014 |
| EP | 2835989 A2 | 2/2015 |
| EP | 2860992 A1 | 4/2015 |
| JP | H02280199 A | 11/1990 |
| JP | H0723490 A | 1/1995 |
| JP | H1069280 A | 3/1998 |
| JP | 2006017893 A | 1/2006 |
| JP | 2011217068 A | 10/2011 |
| KR | 1020060116383 | 11/2006 |
| KR | 1020080011831 | 2/2008 |
| WO | 0153994 | 7/2001 |
| WO | 200182650 | 11/2001 |
| WO | 2003093950 A2 | 11/2003 |
| WO | 2004066673 A1 | 8/2004 |
| WO | 2007016465 A2 | 2/2007 |
| WO | 2013016500 A1 | 1/2013 |
| WO | 2014032709 | 3/2014 |
| WO | 2014036121 A1 | 3/2014 |
| WO | 2015024881 A1 | 2/2015 |
| WO | 2015178950 A1 | 11/2015 |

OTHER PUBLICATIONS

""Constellation Microphones," Meyer Sound Laboratories, Inc., <http://www.meyersound.com/sites/default/files/constellation_microphones.pdf> 2013, 2 pages".

"Ross, Alex. "Wizards of Sound: Retouching acoustics, from the restaurant to the concert hall" The New Yorker, Feb. 23, 2015. Web. Feb. 26, 2015".

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

"Bluetooth. "Specification of the Bluetooth System: The ad hoc Scatternet for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, Dec. 1, 1999, 1076 pages".

"Burger, D., "Automated Room Correction Explained" hometheaterreview.com, Nov. 18, 2013, <http://hometheaterreview.com/automated-room-correction-explained/> Retrieved Oct. 10, 2014, 3 pages".

Co-pending U.S. Appl. No. 14/216,306, filed Mar. 17, 2014.

"Daddy, B., "Calibrating Your Audio with a Sound Pressure Level (SPL) Meter," Blue-ray.com, Feb. 22, 2008 <http://forum.blu-ray.com/showthread.php?t=38765> Retrieved Oct. 10, 2014, 15 pages".

"Dell, Inc. "Dell Digital Audio Receiver: Reference Guide" Jun. 2000, 70 pages".

"Dell, Inc. "Start Here" Jun. 2000, 2 pages".

Jo J., et al., "Synchronized One-to-many Media Streaming with Adaptive Playout Control," Proceedings of SPIE, 2002, vol. 4861, pp. 71-82.

"Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Mulcahy, J. "Room EQ Wizard: Room Acoustics Software" REW 2014 <http://www.roomeqwizard.com> Retrieved Oct. 10, 2014, 4 pages".

"Palm, Inc. "Handbook for the Palm VII Handheld" May 2000, 311 pages".

"UPnP; "Universal Plug and Play Device Architecture"; Jun. 8, 2000; version 1.0; Microsoft Corporation; pp. 1-54".

"Presentations at WinHEC 2000" May 2000, 138 pages.

International Searching Authority, International Search Report and Written Opinion mailed on Nov. 23, 2015, issued in connection with International Application No. PCT/US2015/048942, filed on Sep. 8, 2015, 14 pages.

Preinterview First Office Action mailed on May 25, 2016, issued in connection with U.S. Appl. No. 14/481,514, filed Sep. 9, 2014, 7 pages.

First Action Interview Office Action mailed on Jun. 30, 2016, issued in connection with U.S. Appl. No. 14/481,505, filed Sep. 9, 2014, 9 pages.

Non-Final Office Action mailed on Jul. 13, 2016, issued in connection with U.S. Appl. No. 14/940,779, filed Nov. 13, 2015, 16 pages.

"Denon 2003-2004 Product Catalog," Denon, 2003-2004, 44 pages.

European Patent Office, Extended European Search Report dated Jan. 5, 2017, issued in connection with European Patent Application No. 15765555.6, 8 pages.

European Patent Office, Office Action dated Dec. 15, 2016, issued in connection with European Application No. 15766998.7, 7 pages.

(56) References Cited

OTHER PUBLICATIONS

Final Office Action dated Oct. 14, 2016, issued in connection with U.S. Appl. No. 14/682.182, filed Apr. 9, 2015, 16 pages.
Final Office Action dated Oct. 17, 2016, issued in connection with U.S. Appl. No. 14/678,248, filed Apr. 3, 2015, 22 pages.
Final Office Action dated Dec. 18, 2014, issued in connection with U.S. Appl. No. 13/340,126, filed Dec. 29, 2011, 12 pages.
Final Office Action dated Jan. 19, 2017, issued in connection with U.S. Appl. No. 14/940,779, filed Nov. 13, 2015, 15 pages.
Final Office Action dated Oct. 21, 2016, issued in connection with U.S. Appl. No. 14/696,014, filed Apr. 24, 2015, 13 pages.
First Action Interview Pilot Program Pre-Interview Communication dated Oct. 7, 2015, issued in connection with U.S. Appl. No. 14/216,306, filed Mar. 17, 2014, 5 pages.
First Action Interview Pilot Program Pre-Interview Communication dated Feb. 16, 2016, issued in connection with U.S. Appl. No. 14/681,465, filed Apr. 8, 2015, 5 pages.
Gonzalez et al., "Simultaneous Measurement of Multichannel Acoustic Systems," J. Audio Eng. Soc., 2004, pp. 26-42, vol. 52, No. 1/2.
International Bureau, International Preliminary Report on Patentability, dated Sep. 24, 2015, issued in connection with International Application No. PCT/US2014/030560, filed Mar. 17, 2014, 7 pages.
International Bureau, International Preliminary Report on Patentability dated Sep. 29, 2016, issued in connection with International Application No. PCT/US2015/020993, filed Mar. 17, 2015, 8 pages.
International Bureau, International Preliminary Report on Patentability dated Sep. 29, 2016, issued in connection with International Application No. PCT/US2015/021000, filed Mar. 17, 2015, 9 pages.
International Searching Authority, International Search Report and Written Opinion dated Jul. 4, 2016, issued in connection with International Application No. PCT/US2016/028994, filed Apr. 22, 2016, 12 pages.
International Searching Authority, International Search Report and Written Opinion dated Jul. 5, 2016, issued in connection with International Application No. PCT/US2016/028997, filed Apr. 22, 2016, 13 pages.
International Searching Authority, International Search Report and Written Opinion dated Jun. 5, 2015, issued in connection with International Application No. PCT/US2015/021000, filed Mar. 17, 2015, 12 pages.
International Searching Authority, International Search Report and Written Opinion dated Jun. 16, 2015, issued in connection with International Application No. PCT/US2015/020993, filed Mar. 17, 2015, 11 pages.
International Searching Authority, International Search Report and Written Opinion dated Nov. 18, 2015, issued in connection with International Application No. PCT/US2015/048954, filed Sep. 8, 2015, 11 pages.
International Searching Authority, International Search Report and Written Opinion dated Oct. 18, 2016, issued in connection with International Application No. PCT/US2016/043116, filed Jul. 20, 2016, 114 pages.
International Searching Authority, International Search Report and Written Opinion dated Oct. 18, 2016, issued in connection with International Application No. PCT/US2016/043840, filed Jul. 25, 2016, 14 pages.
International Searching Authority, International Search Report and Written Opinion dated Nov. 23, 2015, issued in connection with International Application No. PCT/US2015/048944, filed Sep. 8, 2015, 12 pages.
International Searching Authority, International Search Report and Written Opinion dated Nov. 23, 2016, issued in connection with International Patent Application No. PCT/US2016/052266, filed Sep. 16, 2016, 11 pages.
International Searching Authority, International Search Report and Written Opinion dated Oct. 25, 2016, issued in connection with International Application No. PCT/US2016/043109, filed Jul. 20, 2016, 12 pages.

"auEQ for the iPhone," Mar. 25, 2015, retrieved from the internet: URL:https://web.archive.org/web20150325152629/http://www.hotto.de/mobileapps/iphoneaueq.html [retrieved on Jun. 24, 2016], 6 pages.
Microsoft Corporation, "Using Microsoft Outlook 2003," Cambridge College, 2003.
Motorola, "Simplefi, Wireless Digital Audio Receiver, Installation and User Guide," Dec. 31, 2001, 111 pages.
Non-Final Action dated Jan. 29, 2016, issued in connection with U.S. Appl. No. 14/481,511, filed Sep. 9, 2014, 10 pages.
Non-Final Office Action dated Jun. 2, 2014, issued in connection with U.S. Appl. No. 13/340,126, filed Dec. 29, 2011, 14 pages.
Non-Final Office Action dated Feb. 3, 2016, issued in connection with U.S. Appl. No. 14/481,522, filed Sep. 9, 2014, 12 pages.
Non-Final Office Action dated Jan. 4, 2017, issued in connection with U.S. Appl. No. 15/207,682, filed JUl. 12, 2016, 6 pages.
Non-Final Office Action dated Nov. 4, 2016, issued in connection with U.S. Appl. No. 14/826,856, filed Aug. 14, 2015, 10 pages.
Non-Final Office Action dated Jul. 6, 2016, issued in connection with U.S. Appl. No. 15/070,160, filed Mar. 15, 2016, 6 pages.
Non-Final Office Action dated Oct. 6, 2016, issued in connection with U.S. Appl. No. 14/678,263, filed Apr. 3, 2015, 30 pages.
Non-Final Office Action dated Dec. 7, 2015, issued in connection with U.S. Appl. No. 14/921,762, filed Oct. 23, 2015, 5 pages.
Non-Final Office Action dated Jul. 7, 2016, issued in connection with U.S. Appl. No. 15/066,049, filed Mar. 10, 2016, 6 pages.
Non-Final Office Action dated Sep. 7, 2016, issued in connection with U.S. Appl. No. 14/826,873, filed Aug. 14, 2015, 12 pages.
Non-Final Office Action dated Jul. 8, 2016, issued in connection with U.S. Appl. No. 15/066,072, filed Mar. 10, 2016, 6 pages.
Non-Final Office Action dated Dec. 9, 2016, issued in connection with U.S. Appl. No. 14/678,248, filed Apr. 3, 2015, 22 pages.
Non-Final Office Action dated Sep. 12, 2016, issued in connection with U.S. Appl. No. 14/811,587, filed Jul. 28, 2015, 24 pages.
Non-Final Office Action dated Dec. 14, 2016, issued in connection with U.S. Appl. No. 14/481,505, filed Sep. 9, 2014, 19 pages.
Non-Final Office Action dated Oct. 14, 2015, issued in connection with U.S. Appl. No. 14/216,325, filed Mar. 17, 2014, 7 pages.
Non-Final Office Action dated Feb. 18, 2016, issued in connection with U.S. Appl. No. 14/644,136, filed Mar. 10, 2015, 10 pages.
Non-Final Office Action dated Jul. 20, 2016, issued in connection with U.S. Appl. No. 14/682,182, filed Apr. 9, 2015, 13 pages.
Non-Final Office Action dated Jun. 21, 2016, issued in connection with U.S. Appl. No. 14/678,248, filed Apr. 3, 2015, 10 pages.
Non-Final Office Action dated Nov. 21, 2014, issued in connection with U.S. Appl. No. 13/536,493, filed Jun. 28, 2012, 20 pages.
Non-Final Office Action dated Oct. 25, 2016, issued in connection with U.S. Appl. No. 14/864,506, filed Sep. 24, 2015, 9 pages.
Non-Final Office Action dated Jul. 27, 2016, issued in connection with U.S. Appl. No. 14/696,014, filed Apr. 24, 2015, 11 pages.
Non-Final Office Action dated Jul. 28, 2016, issued in connection with U.S. Appl. No. 14/884,001, filed Oct. 15, 2015, 8 pages.
Notice of Allowance dated Nov. 2, 2016, issued in connection with U.S. Appl. No. 14/884,001, filed Oct. 15, 2015, 8 pages.
Notice of Allowance dated Jun. 3, 2016, issued in connection with U.S. Appl. No. 14/921,799, filed Oct. 23, 2015, 8 pages.
Notice of Allowance dated Dec. 7, 2015, issued in connection with U.S. Appl. No. 14/216,325, filed Mar. 17, 2014, 7 pages.
Notice of Allowance dated Nov. 9, 2016, issued in connection with U.S. Appl. No. 14/805,340, filed Jul. 21, 2015, 13 pages.
Notice of Allowance dated Apr. 10, 2015, issued in connection with U.S. Appl. No. 13/536,493, filed Jun. 28, 2012, 8 pages.
Notice of Allowance dated Mar. 11, 2015, issued in connection with U.S. Appl. No. 13/340,126, filed Dec. 29, 2011, 7 pages.
Notice of Allowance dated Apr. 12, 2016, issued in connection with U.S. Appl. No. 14/681,465, filed Apr. 8, 2015, 13 pages.
Notice of Allowance dated Dec 12, 2016, issued in connection with U.S. Appl. No. 14/805,140, filed Jul. 21, 2015, 24 pages.
Notice of Allowance dated Sep. 12, 2016, issued in connection with U.S. Appl. No. 15/066,072, filed Mar. 10, 2016, 7 pages.
Notice of Allowance dated Sep. 16, 2016, issued in connection with U.S. Appl. No. 15/066,049, filed Mar. 10, 2016, 7 pages.

(56) References Cited

OTHER PUBLICATIONS

Notice of Allowance dated Aug. 19, 2016, issued in connection with U.S. Appl. No. 14/644,136, filed Mar. 10, 2015, 12 pages.
Notice of Allowance dated Dec. 21, 2016, issued in connection with U.S. Appl. No. 14/682,182, filed Apr. 9, 2015, 8 pages.
Notice of Allowance dated Jun. 23, 2016, issued in connection with U.S. Appl. No. 14/921,781, filed Oct. 23, 2015, 8 pages.
Notice of Allowance dated Sep. 23, 2016, issued in connection with U.S. Appl. No. 15/070,160, filed Mar. 15, 2016, 7 pages.
Notice of Allowance dated Oct. 25, 2016, issued in connection with U.S. Appl. No. 14/826,873, filed Aug. 14, 2015, 5 pages.
Notice of Allowance dated Feb. 26, 2016, issued in connection with U.S. Appl. No. 14/921,762, filed Oct. 23, 2015, 7 pages.
Notice of Allowance dated Jul. 26, 2016, issued in connection with U.S. Appl. No. 14/481,511, filed Sep. 9, 2014, 12 pages.
Notice of Allowance dated Oct. 26, 2016, issued in connection with U.S. Appl. No. 14/811,587, filed Jul. 28, 2015, 11 pages.
Notice of Allowance dated Jul. 29, 2016, issued in connection with U.S. Appl. No. 14/481,522, filed Sep. 9, 2014, 11 pages.
Notice of Allowance dated Oct. 29, 2015, issued in connection with U.S. Appl. No. 14/216,306, filed Mar. 17, 2014, 9 pages.
Notice of Allowance dated Dec. 30, 2016, issued in connection with U.S. Appl. No. 14/696,014, filed Apr. 24, 2015, 13 pages.
Preinterview First Office Action dated Oct. 6, 2016, issued in connection with U.S. Appl. No. 14/726,921, filed Jun. 1, 2015, 6 pages.
PRISMIQ, Inc., "PRISMIQ Media Player User Guide," 2003, 44 pages.
Supplemental Notice of Allowability dated Oct. 27, 2016, issued in connection with U.S. Appl. No. 14/481,511, filed Sep. 9, 2014, 6 pages.
United States Patent and Trademark Office, U.S. Appl. No. 60/490,768 filed Jul. 28, 2003, entitled "Method for synchronizing audio playback between multiple networked devices," 13 pages.
United States Patent and Trademark Office, U.S. Appl. No. 60/825,407 filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Corrected Notice of Allowability dated Jan. 19, 2017, issued in connection with U.S. Appl. No. 14/826,873, filed Aug. 14, 2015, 11 pages.
European Patent Office, Extended Search Report dated Jan. 25, 2017, issued in connection with European Application No. 15765548.1, 7 pages.
European Patent Office, Extended Search Report dated Apr. 26, 2017, issued in connection with European Application No. 15765548.1, 10 pages.
Final Office Action dated Apr. 3, 2017, issued in connection with U.S. Appl. No. 14/678,248, filed Apr. 3, 2015, 22 pages.
Final Office Action dated Apr. 18, 2017, issued in connection with U.S. Appl. No. 14/678,263, filed Apr. 3, 2015, 16 pages.
First Action Interview Office Action dated Mar. 3, 2017, issued in connection with U.S. Appl. No. 14/726,921, filed Jun. 1, 2015, 9 pages.
First Action Interview Pilot Program Pre-Interview Communication dated Apr. 5, 2017, issued in connection with U.S. Appl. No. 14/793,190, filed Jul. 7, 2015, 4 pages.
International Searching Authority, International Preliminary Report on Patentability dated Mar. 23, 2017, issued in connection with International Patent Application No. PCT/US2015/048944, filed Sep. 8, 2015, 8 pages.
International Searching Authority, International Search Report and Written Opinion dated Oct. 12, 2016, issued in connection with International Application No. PCT/US2016/041179 filed Jul. 6, 2016, 9 pages.
International Searching Authority, International Search Report and Written Opinion dated Jan. 24, 2017, issued in connection with International Application No. PCT/US2016/052264, filed Sep. 16, 2016, 17 pages.
Japanese Patent Office, Non-Final Office Action with Translation dated Apr. 25, 2017, issued in connection with Japanese Patent Application No. 2016-568888, 7 pages.
Non-Final Office Action dated Mar. 1, 2017, issued in connection with U.S. Appl. No. 15/344,069, filed Nov. 4, 2016, 20 pages.
Non-Final Office Action dated Jun. 2, 2017, issued in connection with U.S. Appl. No. 15/229,693, filed Aug. 5, 2016, 18 pages.
Non-Final Office Action dated Mar. 10, 2017, issued in connection with U.S. Appl. No. 14/997,868, filed Jan. 18, 2016, 10 pages.
Non-Final Office Action dated Apr. 11, 2017, issued in connection with U.S. Appl. No. 15/088,994, filed Apr. 1, 2016, 13 pages.
Non-Final Office Action dated Apr. 11, 2017, issued in connection with U.S. Appl. No. 15/089,004, filed Apr. 1, 2016, 9 pages.
Non-Final Office Action dated Mar. 14, 2017, issued in connection with U.S. Appl. No. 15/096,827, filed Apr. 12, 2016, 12 pages.
Non-Final Office Action dated Apr. 20, 2017, issued in connection with U.S. Appl. No. 15/005,853, filed Jan. 25, 2016, 8 pages.
Non-Final Office Action dated Mar. 27, 2017, issued in connection with U.S. Appl. No. 15/211,835, filed Jul. 15, 2016, 30 pages.
Notice of Allowance dated May 1, 2017, issued in connection with U.S. Appl. No. 14/805,140, filed Jul. 21, 2015, 13 pages.
Notice of Allowance dated Feb. 13, 2017, issued in connection with U.S. Appl. No. 14/864,506, filed Sep. 24, 2015, 8 pages.
Notice of Allowance dated Mar. 15, 2017, issued in connection with U.S. Appl. No. 14/826,856, filed Aug. 14, 2015, 7 pages.
Notice of Allowance dated May 17, 2017, issued in connection with U.S. Appl. No. 15/339,260, filed Oct. 31, 2016, 7 pages.
Notice of Allowance dated Apr. 20, 2017, issued in connection with U.S. Appl. No. 14/940,779, filed Nov. 13, 2015, 11 pages.
Notice of Allowance dated May 24, 2017, issued in connection with U.S. Appl. No. 14/997,868, filed Jan. 18, 2016, 5 pages.
Notice of Allowance dated Apr. 25, 2017, issued in connection with U.S. Appl. No. 14/696,014, filed Apr. 24, 2015, 7 pages.
Notice of Allowance dated Apr. 25, 2017, issued in connection with U.S. Appl. No. 15/207,682, filed Jul. 12, 2016, 7 pages.
Notice of Allowance dated Feb. 27, 2017, issued in connection with U.S. Appl. No. 14/805,340, filed Jul. 21, 2015, 9 pages.
Notice of Allowance dated Jan. 30, 2017, issued in connection with U.S. Appl. No. 15/339,260, filed Oct. 31, 2016, 8 pages.
Notice of Allowance dated Apr. 4, 2017, issued in connection with U.S. Appl. No. 14/682,180, filed Apr. 9, 2015, 8 pages.
Notice of Allowance dated May 5, 2017, issued in connection with U.S. Appl. No. 14/826,873, filed Aug. 14, 2015, 5 pages.
Notice of Allowance dated Apr. 19, 2017, issued in connection with U.S. Appl. No. 14/481,511, filed Sep. 9, 2014, 10 pages.

* cited by examiner

| Playback Zone Acoustic Characteristic | Audio Processing Algorithm |
|---|---|
| $h_{room}^{-1}(t)\text{-}1$ | $w_1; x_1; y_1; z_1$ ←602 |
| $h_{room}^{-1}(t)\text{-}2$ | $w_2; x_2; y_2; z_2$ ←604 |
| $h_{room}^{-1}(t)\text{-}3$ | $w_3; x_3; y_3; z_3$ ←606 |
| $h_{room}^{-1}(t)\text{-}4$ | $w_4; x_4; y_4; z_4$ ←608 |
| ⋮ | ⋮ |

| Playback Zone Acoustic Characteristic | Zone Dimensions | Audio Processing Algorithm |
|---|---|---|
| $h_{room}^{-1}(t)\text{-}1$ | $a_1 \times b_1 \times c_1$ | $w_1; x_1; y_1; z_1$ ←652 |
| $h_{room}^{-1}(t)\text{-}2$ | $a_2 \times b_2 \times c_2$ | $w_2; x_2; y_2; z_2$ ←654 |
| $h_{room}^{-1}(t)\text{-}3$ | $a_3 \times b_3 \times c_3$ | $w_3; x_3; y_3; z_3$ ←656 |
| $h_{room}^{-1}(t)\text{-}4$ | $a_4 \times b_4 \times c_4$ | $w_4; x_4; y_4; z_4$ ←658 |
| ⋮ | ⋮ | ⋮ |

AUDIO PROCESSING ALGORITHM DATABASE

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6A shows an example portion of a first database of audio processing algorithms;

FIG. 6B shows an example portion of a second database of audio processing algorithms;

Figure 1:
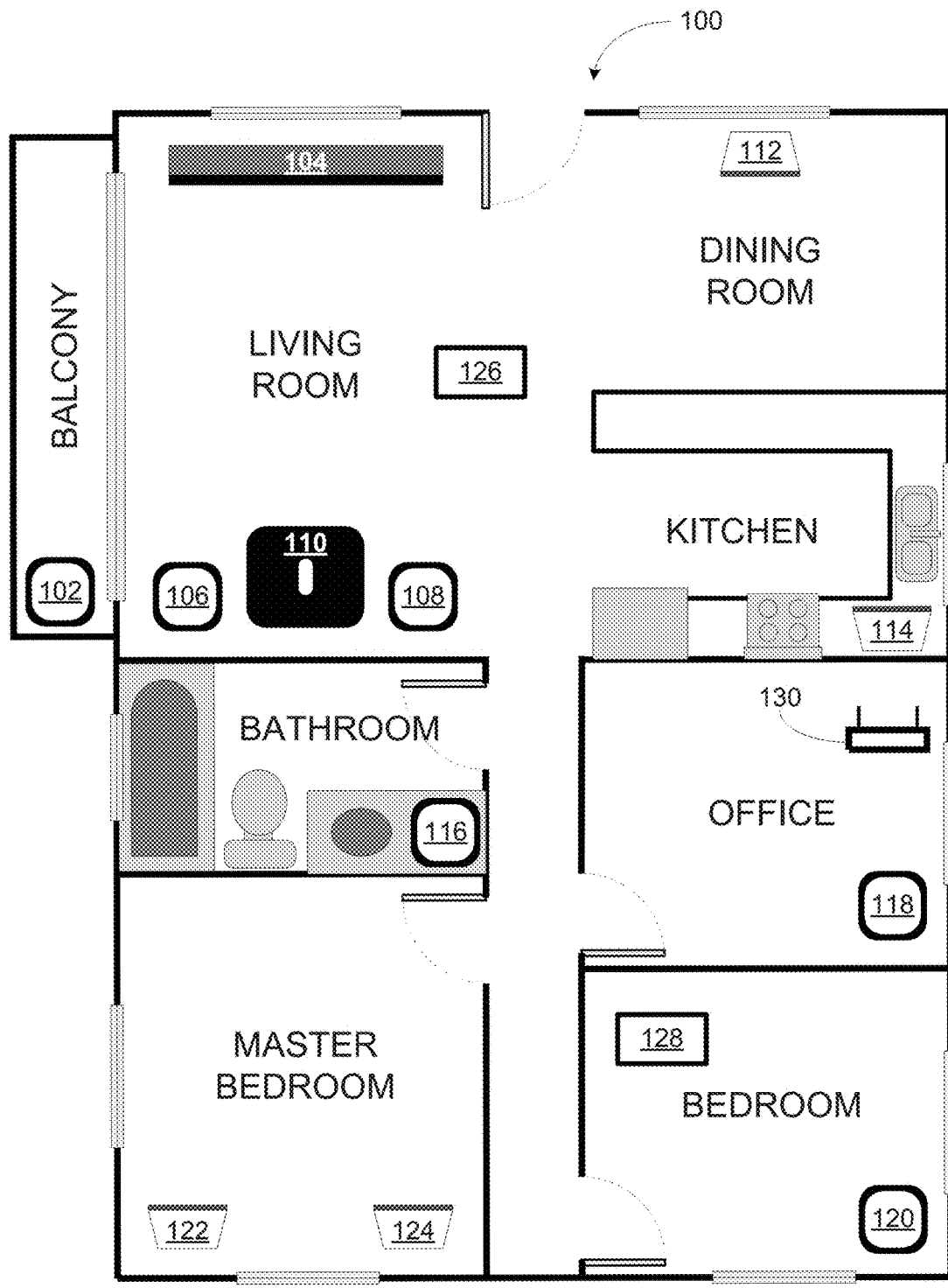
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

When a playback device plays audio content in a playback zone, a quality of the playback may depend on an acoustic characteristic of the playback zone. In discussions herein, the playback zone may include one or more playback devices or groups of playback devices. The acoustic characteristic of the playback zone may depend on a dimension of the playback zone, types of furniture in the playback zone, and an arrangement of the furniture in the playback zone, among other factors. As such, different playback zones may have different acoustic characteristics. Because a given model of the playback device may be used in a variety of different playback zones with different acoustic characteristics, a single audio processing algorithm may not provide a consistent quality of audio playback by the playback device in each of the different playback zones.

Examples discussed herein relate to determining an audio processing algorithm for the playback device to apply based on acoustic characteristics of a playback zone the playback device is in. Application of the determined audio processing algorithm by the playback device when playing audio content in the playback zone may cause audio content rendered by the playback device in the playback zone to assume a predetermined audio characteristic, at least to some extent. In one case, application of the audio processing algorithm may alter audio amplifications at one or more audio frequencies of the audio content. Other examples are also possible.

In one example, the database of audio processing algorithms may be maintained, and an audio processing algorithm in the database may be identified based on one or more characteristics of the playback zone. The one or more characteristics of the playback zone may include the acoustic characteristic of the playback zone, and/or one or more of a dimension of the playback zone, a flooring and/or wall material of the playback zone, and a number and/or types of furniture in the playback zone, among other possibilities.

Maintaining the database of audio processing algorithms may involve determining at least one audio processing algorithm that corresponds to the one or more characteristics of the playback zone, and adding the determined audio processing algorithm to the database. In one example, the database may be stored on one or more devices maintaining the database, or one or more other devices. In discussions herein, unless otherwise noted, the functions for maintaining the database may be performed by one or more computing devices (i.e. servers), one or more playback devices, or one or more controller devices, among other possibilities. However, for simplicity, the one or more devices performing the functions may be generally referred to as a computing device.

In one example, determining such an audio processing algorithm may involve the computing device determining an acoustic characteristic of a playback zone. In one case, the playback zone may be a model room used to simulate a playback zone within which the playback device may play audio content. In such a case, one or more physical characteristics of the model room (i.e. dimensions, and floor and wall materials, etc.) may be pre-determined. In another case, the playback zone may be a room in a home of a user of the playback device. In such a case, the physical characteristics of the playback zone may be provided by the user, or may be otherwise unknown.

In one example, the computing device may cause the playback device in the playback zone to play an audio signal. In one case, the played audio signal may include audio content with frequencies covering substantially an entire frequency range renderable by the playback device. The playback device may subsequently detect an audio signal using a microphone of the playback device. The microphone of the playback devices may be a built-in microphone of the playback device. In one case, the detected audio signal may include a portion corresponding to the played audio signal. For instance, the detected audio signal may include a component of the played audio signal reflected within the playback zone. The computing device may receive the detected audio signal from the playback device, and determine an acoustic response of the playback zone based on the detected audio signal.

The computing device may then determine the acoustic characteristic of the playback zone by removing an acoustic characteristic of the playback device from the acoustic response of the playback zone. The acoustic characteristic of the playback device may be an acoustic characteristic corresponding to a model of the playback device. In one case, the acoustic characteristic corresponding to the model of the playback device may be determined based on audio signals played and detected by a representative playback device of the model in an anechoic chamber.

The computing device may then determine a corresponding audio processing algorithm based on the determined acoustic characteristics of the playback zone and a predetermined audio characteristic. The predetermined audio characteristics may involve a particular frequency equalization that is considered good-sounding. The corresponding audio processing algorithm may be determined such that an application of the corresponding audio processing algorithm by the playback device when playing audio content in the playback zone causes audio content rendered by the playback device in the playback zone to assume the predetermined audio characteristic, at least to some extent. For instance, if the acoustic characteristic of the playback zone is one in which a particular audio frequency is more attenuated than other frequencies, the corresponding audio processing algorithm may involve an increased amplification of the particular audio frequency. Other examples are also possible.

An association between the determined audio processing algorithm and the acoustic characteristic of the playback zone may then be stored as an entry in a database. In some cases, an association between the audio processing algorithm and one or more other characteristics of the playback zone may additionally or alternatively be stored in the database. For instance, if the playback zone is of a particular dimension, an association between the audio processing algorithm and the particular room dimension may be stored in the database. Other examples are also possible.

In one example, the database may be accessed by a computing device to identify an audio processing algorithm for a playback device to apply in a playback zone. In one example, the computing device accessing the database and identifying the audio processing algorithm may be the same computing device maintaining the database, as described above. In another example, the computing device may be a different computing device.

In some cases, accessing the database to identify an audio processing algorithm for the playback device to apply in the playback zone may be a part of a calibration of the playback device. Such a calibration of the playback device may be initiated by the playback device itself, by a server in communication with the playback device, or by a controller device. In one case, the calibration may be initiated because the playback device is new and the calibration is part of an initial setup of the playback device. In another case, the playback device may have been repositioned, either within the same playback zone or from one playback zone to another. In a further case, the calibration may be initiated by a user of the playback device, such as via the controller device.

In one example, calibration of the playback device may involve the computing device prompting the user of the playback device to indicate one or more characteristics of the playback zone, such as an approximate dimension of the playback zone, flooring or wall material, and amount of furniture, among other possibilities. The computing device may prompt the user via a user interface on a controller device. Based on the one or more characteristics of the playback zone as provided by the user, an audio processing algorithm corresponding to the one or more characteristics of the playback zone may be identified in the database, and the playback device may accordingly apply the identified audio processing algorithm when playing audio content in the playback zone.

In another example, calibration of the playback device may involve determining an acoustic characteristic of the playback zone and identifying a corresponding audio processing algorithm based on the acoustic characteristic of the playback zone. Determination of the acoustic characteristic of the playback zone may be similar to that described above. For instance, the playback device in the playback zone for which the playback device is being calibrated for may play a first audio signal and subsequently detect using a microphone of the playback device, a second audio signal. The second audio signal may then be based upon to determine an acoustic characteristic of the playback zone. Based on the determined acoustic characteristic, a corresponding audio processing algorithm may be identified in the database, and the playback device may accordingly apply the identified audio processing algorithm when playing audio content in the playback zone. As indicated above, application of the corresponding audio processing algorithm by the playback device when playing audio content in the playback zone may cause audio content rendered by the playback device in the playback zone to assume the predetermined audio characteristic, at least to some extent.

While discussions of the calibration of the playback device discussed above generally involve the database of audio processing algorithms, one having ordinary skill in the art will appreciate that the computing device may determine an audio processing algorithm for a playback zone without accessing the database. For instance, instead of identifying a corresponding audio processing algorithm in the database, the computing device may determine the audio processing algorithm by calculating the audio processing algorithm based on the acoustic characteristic of the playback zone (from the detected audio signal) and the predetermined audio characteristic, similar to that described above in connection to maintenance of and generation of audio processing algorithm entries for the database. Other examples are also possible.

In one case, the playback device to be calibrated may be one of a plurality of playback devices configured to synchronously play audio content in the playback zone. In such a case, determination of the acoustic characteristic of a playback zone may also involve audio signals played by other playback devices in the playback zone. In one example, during the determination of the audio processing algorithm, each of the plurality of playback devices in the playback zone may play audio signals at the same time such that the audio signal detected by the microphone of the playback device may include a portion corresponding to the audio signal played by the playback device, as well as portions of audio signals played by the other playback devices in the playback zone. An acoustic response of the playback zone may be determined based on the detected audio signal, and an acoustic characteristic of the playback zone, including the other playback devices, may be determined by removing an acoustic characteristic of the playback device being calibrated from the acoustic response of the playback zone. An audio processing algorithm may then be calculated or identified in the database based on the acoustic characteristic of the playback zone and applied by the playback device.

In another case, two or more playback devices in the plurality of playback devices in the playback zone may each have a respective built-in microphone, and may each be individually calibrated according to the descriptions above. In one instance, the acoustic characteristic of the playback zone may be determined based on a collection of audio signals detected by microphones of each of the two or more playback devices, and an audio processing algorithm corresponding to the acoustic characteristic may be identified for each of the two or more playback devices. Other examples are also possible.

As indicated above, the present discussions involve determining an audio processing algorithm for the playback device to apply based on acoustic characteristics of a particular playback zone the playback device is in. In one aspect, a computing device is provided. The computing device includes a processor, and memory having stored thereon instructions executable by the processor to cause the computing device to perform functions. The functions include causing a playback device in a playback zone to play a first audio signal, and receiving from the playback device, data indicating a second audio signal detected by a microphone of the playback device. The second audio signal includes a portion corresponding to the first audio signal. The functions further include based on the second audio signal and an acoustic characteristic of the playback device, determining an audio processing algorithm, and transmitting data indicating the determined audio processing algorithm to the playback device.

In another aspect, a computing device is provided. The computing device includes a processor, and memory having stored thereon instructions executable by the processor to cause the computing device to perform functions. The functions include causing a first playback device to play a first audio signal in a playback zone, causing a second playback device to play a second audio signal in the playback zone, and receiving from the first playback device, data indicating a third audio signal detected by a microphone of the first playback device. The third audio signal includes (i) a portion corresponding to the first audio signal, and (ii) a portion corresponding to the second audio signal played by a second playback device. The functions also include based on the third audio signal and an acoustic characteristic of the first playback device, determining an audio processing algorithm, and transmitting data indicating the determined audio processing algorithm to the first playback device.

In another aspect, a playback device is provided. The playback device includes a processor, a microphone, and memory having stored thereon instructions executable by the processor to cause the playback device to perform functions. The functions include while in a playback zone, playing a first audio signal, and detecting by the microphone, a second audio signal. The second audio signal includes a portion corresponding to the first audio signal. The functions also include based on the second audio signal and an acoustic characteristic of the playback device, determining an audio processing algorithm, and applying the determined audio processing algorithm to audio data corresponding to a media item when playing the media item in the playback zone.

In another aspect, a computing device is provided. The computing device includes a processor, and memory having stored thereon instructions executable by the processor to cause the computing device to perform functions. The functions include causing a playback device in a playback zone to play a first audio signal, and receiving data indicating a second audio signal detected by a microphone of the playback device. The second audio signal includes a portion corresponding to the first audio signal played by the playback device. The functions also include based on the second audio signal and a characteristic of the playback device, determining an acoustic characteristic of the playback zone, based on the acoustic characteristic of the playback zone, determining an audio processing algorithm, and causing to be stored in a database, an association between the audio processing algorithm and the acoustic characteristic of the playback zone.

In another aspect, a computing device is provided. The computing device includes a processor, and memory having stored thereon instructions executable by the processor to cause the computing device to perform functions. The functions include causing a playback device in a playback zone to play a first audio signal, and receiving (i) data indicating one or more characteristics of a playback zone, and (ii) data indicating a second audio signal detected by a microphone of the playback device. The second audio signal includes a portion corresponding to the audio signal played by the playback device. The functions also include based on the second audio signal and a characteristic of the playback device, determining an audio processing algorithm, and cause to be stored in a database, an association between the determined audio processing algorithm and at least one of the one or more characteristics of the playback zone.

In another aspect, a computing device is provided. The computing device includes a processor, and memory having stored thereon instructions executable by the processor to cause the playback device to perform functions. The functions include maintaining a database of (i) a plurality of audio processing algorithms and (ii) a plurality of playback zone characteristics. Each audio processing algorithm of the plurality of audio processing algorithms corresponds to at least one playback zone characteristic of the plurality of playback zone characteristics. The functions also include receiving data indicating one or more characteristics of a playback zone, based on the data, identifying in the database, an audio processing algorithm, and transmitting data indicating the identified audio processing algorithm.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
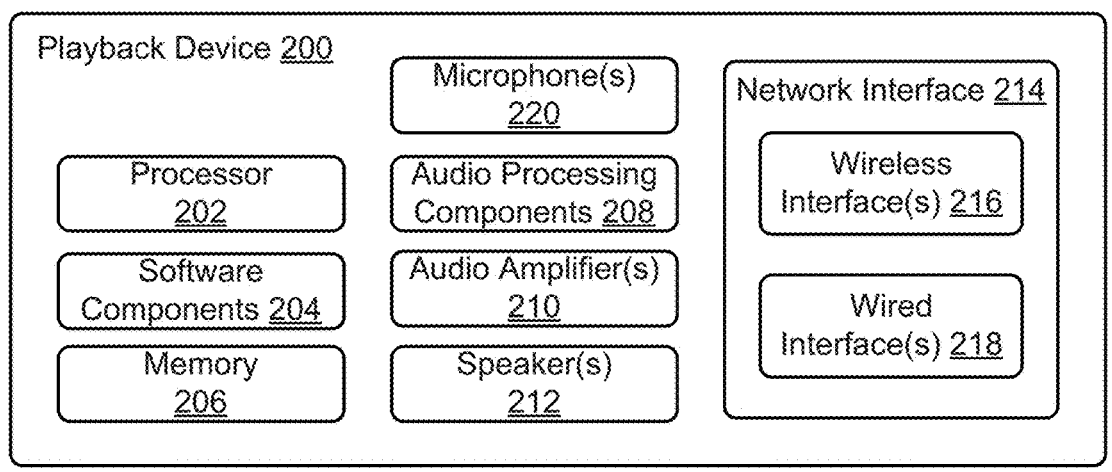
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, microphone(s) 220, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more of digital-to-analog converters (DAC), analog-to-digital converters (ADC), audio preprocessing components, audio enhancement components, and a digital signal processor (DSP), among others. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
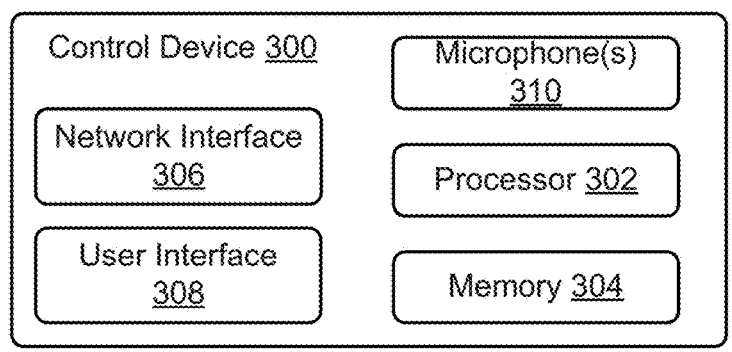
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, and microphone(s) 310. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
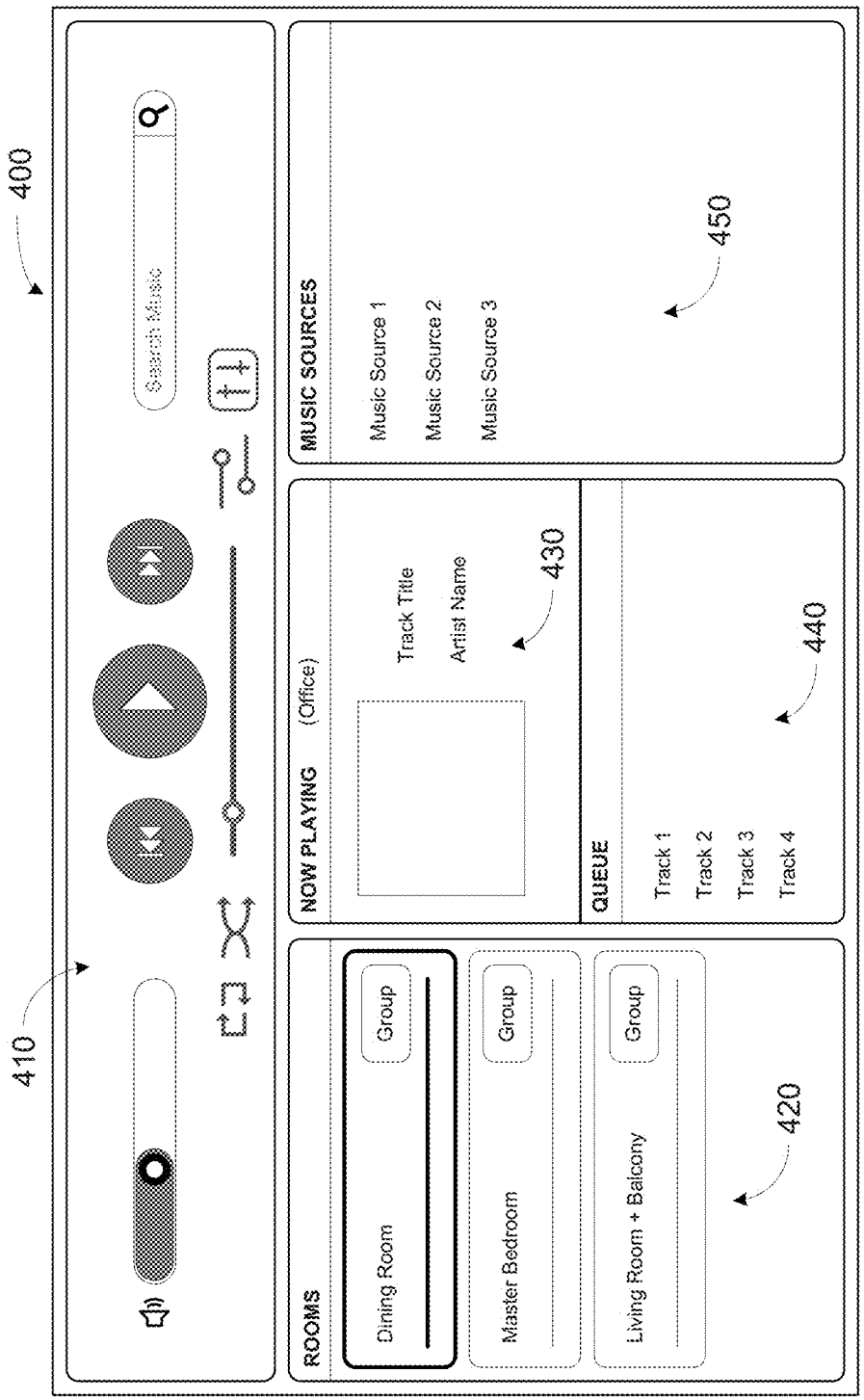
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Maintaining a Database of Signal Processing Algorithms

Figure 5:
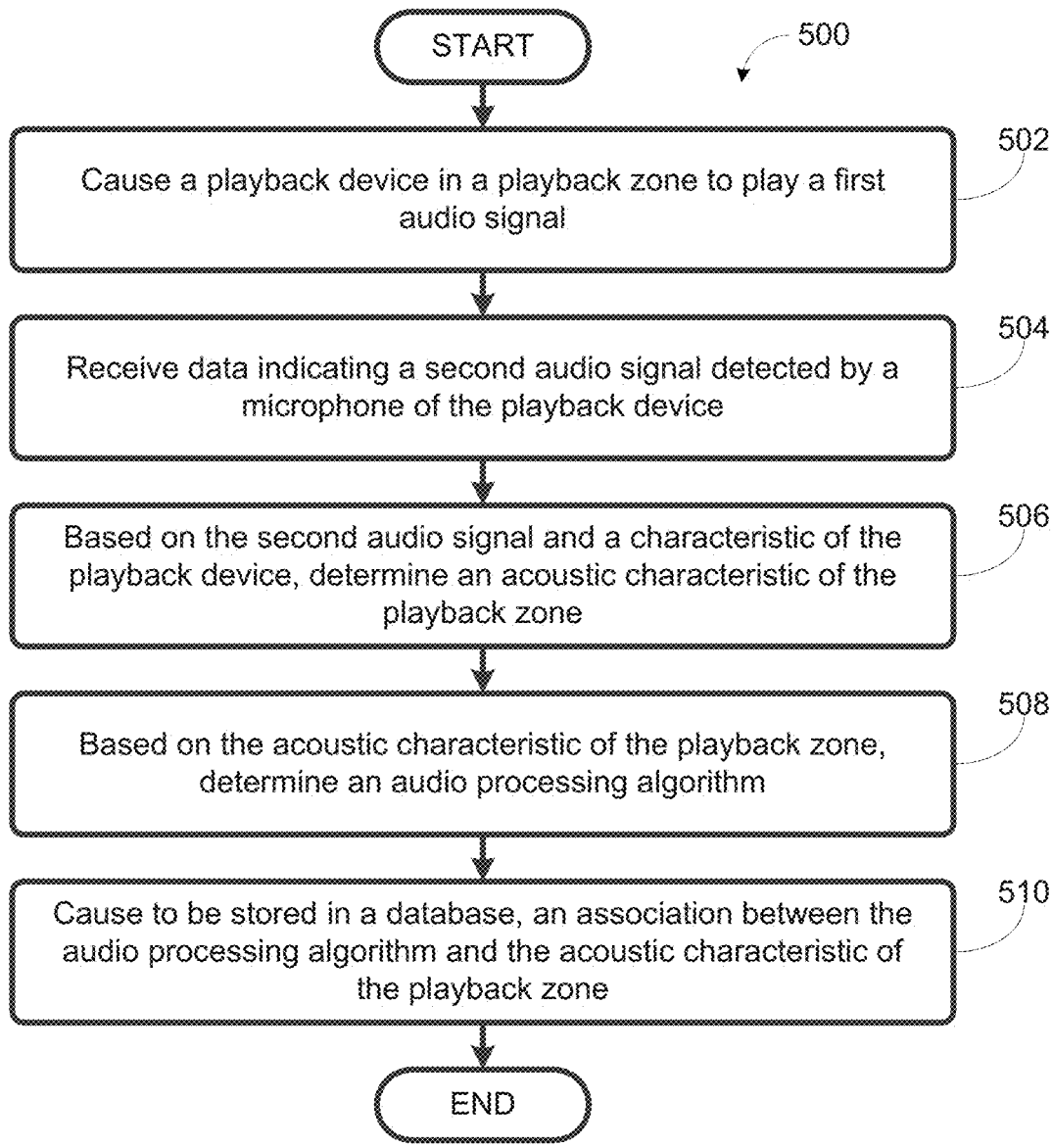
FIG. 5 shows an example flow diagram of a first method for maintaining a database of audio processing algorithms.

As indicated above, some examples discussed herein relate to maintaining a database of audio processing algorithms. In some cases, maintenance of a database may further involve generating and/or updating entries of audio processing algorithms for the database. Each of the audio processing algorithms in the database may correspond to one or more characteristics of the playback zone. In one example, the one or more characteristics of the playback zone may include an acoustic characteristic of the playback zone. While the discussions below may generally relate to determining an audio processing algorithm to be stored as an entry in a database, one having ordinary skill in the art will appreciate that similar functions may also be performed to update existing entries in the database. The database may be accessed to identify an audio processing algorithm for a playback device to apply when playing audio content in a particular playback zone.

a. Example Database of Audio Processing Algorithms and Corresponding Acoustic Characteristics of Playback Zones FIG. 5 shows an example flow diagram of a method 500 for maintaining a database of audio processing algorithms and playback zone acoustic characteristics. As indicated above, maintaining a database of audio processing algorithms may involve determining audio processing algorithms to be stored in the database. Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. In one example, the method 500 may be performed by a computing device that is in communication with a media playback system, such as the media playback system 100. In another example, some or all of the functions of method 500 may alternatively be performed by one or more other computing devices, such as one or more servers, one or more playback devices, and/or one or more controller devices.

Method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block may represent circuitry that is wired to perform the specific logical functions in the process.

As shown in FIG. 5, the method 500 involves the computing device causing a playback device in a playback zone to play a first audio signal at block 502, receiving data indicating a second audio signal detected by a microphone of the playback device at block 504, based on the second audio signal and a characteristic of the playback device, determining an acoustic characteristic of the playback zone at block 506, based on the acoustic characteristic of the playback zone, determining an audio processing algorithm at block 508, and causing to be stored in a database, an association between the audio processing algorithm and the acoustic characteristic of the playback zone at block 510.

As discussed previously, the database may be accessed to identify an audio processing algorithm for a playback device to apply when playing audio content in a playback zone. As such, in one example, the method 500 may be performed for a variety of different playback zones to build a database of audio processing algorithms corresponding to a variety of different playback environments.

At block 502, the method 500 involves causing a playback device in a playback zone to play a first audio signal. The playback device may be a playback device similar to the playback device 200 shown in FIG. 2. In one case, the computing device may cause the playback device to play the first audio signal by sending a command to play the first audio signal. In another case, the computing device may also provide to the playback device the first audio signal to be played.

In one example, the first audio signal may be used for determining an acoustic response of the playback zone. As such, the first audio signal may be a test signal or measurement signal representative of audio content that may be played by the playback device during regular use by a user. Accordingly, the first audio signal may include audio content with frequencies substantially covering a renderable frequency range of the playback device or a frequency range audible to a human.

In one example, the playback zone may be a playback zone representative of one of a plurality of playback environments within which the playback device may play audio content during regular use by a user. Referring to FIG. 1, the playback zone may be representative of any one of the different rooms and zone groups in the media playback system 100. For instance, the playback zone may be representative of the dining room.

In one case, the playback zone may be a model playback zone built to simulate a listening environment within which the playback device may play audio content. In one instance, the playback zone may be one of a plurality of playback zones built to simulate the plurality of playback environments. The plurality of playback zones may be built for purposes of populating such a database of audio processing algorithms. In such a case, certain characteristics of the playback zone may be predetermined and/or known. For instance, a dimension of the playback zone, a flooring or wall material of the playback zone (or other features that may affects an audio reflectivity characteristic of the playback zone), a number of furniture in the playback zone, or sizes and types of the furniture in the playback zone, among other possibilities may be characteristics of the playback zone that may be predetermined and/or known.

In another case, the playback zone may be a room within a household of a user of the playback device. For instance, as part of building the database, users of the playback device, such as customers and/or testers, may be invited to use their playback devices to perform the functions of method 500 to build the database. In some cases, the certain characteristics of the user playback zone may not be known. In some other cases, some or all of the certain characteristics of the user playback zone may be provided by the user. The database populated from performing the functions of method 500 may include entries based on simulated playback zones and/or user playback zones.

While block 502 involves the computing device causing the playback device to play the first audio signal, one having ordinary skill in the art will appreciate that playback of the first audio signal by the playback device may not necessarily be caused or initiated by the computing device. For instance, a controller device may send a command to the playback device to cause the playback device to play the first audio signal. In another instance, the playback device may play the first audio signal without receiving a command from the computing device or controller. Other examples are also possible.

At block 504, the method 500 involves receiving data indicating a second audio signal detected by a microphone of the playback device. As indicated above, the playback device may be a playback device similar to the playback device 200 shown in FIG. 2. As such, the microphone may be the microphone 220. In one example, the computing device may receive the data from the playback device. In another example, the computing device may receive the data via another playback device, a controller device, or another server.

While the playback device is playing the first audio signal, or shortly thereafter, the microphone of the playback device may detect the second audio signal. The second audio signal may include detectable audio signals present in the playback zone. For instance, the second audio signal may include a portion corresponding to the first audio signal played by the playback device.

In one example, the computing device may receive data indicating the detected second audio signal from the playback device as a media stream while the microphone detects the second audio signal. In another example, the computing device may receive from the playback device, data indicating the second audio signal once detection of the first audio signal by the microphone of the playback device is complete. In either case, the playback device may process the detected second audio signal (via an audio processing component, such as the audio processing component 208 of the playback device 200) to generate the data indicating the second audio signal, and transmit the data to the computing device. In one instance, generating the data indicating the second audio signal may involve converting the second audio signal from an analog signal to a digital signal. Other examples are also possible.

At block 506, the method 500 involves based on the second audio signal and a characteristic of the playback device, determining an acoustic characteristic of the playback zone. As indicated above, the second audio signal may include portion corresponding to the first audio signal played by the playback device in the playback zone.

The characteristic of the playback device may include one or more of an acoustic characteristic of the playback device, specifications of the playback device (i.e. number of transducers, frequency range, amplifier wattage, etc.), and a model of the playback device. In some cases, the acoustic characteristic of the playback device and/or specifications of the playback device may be associated with the model of the playback device. For instance, a particular model of playback devices may have substantially the same specifications and acoustic characteristics. In one example, a database of models of playback devices, acoustic characteristics of the models of playback devices, and/or specifications of the models of playback devices may be maintained on the computing device or another device in communication with the computing device.

In one example, an acoustic response from the playback device playing the first audio signal in the playback zone may be represented by a relationship between the first audio signal and the second audio signal. Mathematically, if the first audio signal is f(t), the second audio signal is s(t), and the acoustic response of the playback device playing the first audio signal in the playback zone is $h_r(t)$, then $$s(t)=f(t) \otimes h_r(t) \qquad (1)$$

where $\otimes$ represents the mathematical function of convolution. As such, given the second audio signal s(t) that is detected by the microphone of the playback device, and the first signal f(t) that was played by the playback device, $h_r(t)$ may be calculated.

In one case, because the first audio signal f(t) was played by the playback device, the acoustic response $h_r(t)$ may include (i) an acoustic characteristic of the playback device and (ii) the acoustic characteristic of the playback zone that is independent of the playback device. Mathematically, this relationship may be represented as $$h_r(t)=h_p(t)+h_{room}(t) \qquad (2)$$

where $h_p(t)$ is the acoustic characteristic of the playback device, and $h_{room}(t)$ is the acoustic characteristic of the playback zone, independent of the playback device. As such, the acoustic characteristic of the playback zone that is independent of the playback device may be determined by removing the acoustic characteristic of the playback device from the acoustic response of the playback zone to the first audio signal played by the playback device. In other words, $$h_{room}(t)=h_r(t)-h_p(t). \qquad (3)$$

In one example, the acoustic characteristic of the playback device $h_p(t)$ may be determined by placing the playback device or a representative playback device of the same model in an anechoic chamber, causing the playback device to play a measurement signal in the anechoic chamber, and detecting a response signal by the microphone of the playback device. The measurement signal played by the playback device in the anechoic chamber may be similar to the first audio signal f(t) discussed above. For instance, the measurement signal may have audio content with frequencies substantially covering the renderable frequency range of the playback device or the frequency range audible to a human.

The acoustic characteristic of the playback device $h_p(t)$ may represent a relationship between the played measurement signal and the detected response signal. For instance, if the measurement signal has a first signal magnitude at a particular frequency, and the detected response signal has a second signal magnitude at the particular frequency different from the first signal magnitude, then the acoustic characteristic of the playback device $h_p(t)$ may indicate signal amplification or attenuation at the particular frequency.

Mathematically, if the measurement signal is x(t), the detected response signal is y(t), and the acoustic characteristic of the playback device in the anechoic chamber is $h_p(t)$, then $$y(t)=x(t) \otimes h_p(t). \qquad (4)$$

Accordingly, $h_p(t)$ may be calculated based on the measurement signal x(t) and the detected response signal y(t). As indicated above, $h_p(t)$ may be the representative acoustic characteristic for playback devices of the same model as that used in the anechoic chamber.

In one example, as indicated above, the reference acoustic characteristic $h_p(t)$ may be stored in association with the model of the playback device and/or specifications of the playback device. In one example, $h_p(t)$ maybe stored on the computing device. In another example, $h_p(t)$ may be stored on the playback device and other playback devices of the same model. In a further case, an inverse of $h_p(t)$, represented as $h_p^{-1}(t)$, may be stored instead of $h_p(t)$.

Referring back to block 506, the acoustic characteristic of the playback zone $h_{room}(t)$ may accordingly be determined based on the first audio signal $f(t)$, the second audio signal $s(t)$, and the acoustic characteristic $h_p(t)$ of the playback device. In one example, the inverse of the acoustic characteristic of the playback device, $h_p^{-1}(t)$ may be applied to the equation (2). In other words, $$h_p^{-1}(t) \otimes h_r(t) = h_p^{-1}(t) \otimes h_p(t) + h_p^{-1}(t) \otimes h_{room}(t) \quad (5)$$
$$= I(t) + h_p^{-1}(t) \otimes h_{room}(t)$$

where $I(t)$ is an impulse signal. The acoustic characteristic of the playback zone $h_{room}(t)$ may then be simplified as:

$$h_{room}(t) = h_p(t) \otimes [h_p^{-1}(t) \otimes h_r(t) - I(t)]. \quad (6)$$

At block 506, the method 500 involves based on the acoustic characteristic of the playback zone and a predetermined audio signal, determining an audio processing algorithm. In one example, the audio processing algorithm may be determined such that an application of the determined audio processing algorithm by the playback device when playing the first audio signal in the playback zone may produce a third audio signal having an audio characteristic substantially the same as a predetermined audio characteristic, or assumes the predetermined audio characteristic, at least to some extent.

In one example, the predetermined audio characteristic may be an audio frequency equalization that is considered good-sounding. In one case, the predetermined audio characteristic may involve an equalization that is substantially even across the renderable frequency range of the playback device. In another case, the predetermined audio characteristic may involve an equalization that is considered pleasing to a typical listener. In a further case, the predetermined audio characteristic may involve a frequency response that is considered suitable for a particular genre of music.

Whichever the case, the computing device may determine the audio processing algorithm based on the acoustic characteristic and the predetermined audio characteristic. In one example, if the acoustic characteristic of the playback zone is one in which a particular audio frequency is more attenuated than other frequencies, and the predetermined audio characteristic involves an equalization in which the particular audio frequency is minimally attenuated, the corresponding audio processing algorithm may involve an increased amplification at the particular audio frequency.

If the predetermined audio characteristic is represented by a predetermined audio signal $z(t)$, and the audio processing algorithm is represented by $p(t)$, a relationship between the predetermined audio signal $z(t)$, the audio processing algorithm, and the acoustic characteristic of the playback zone $h_{room}(t)$ may be mathematically described as:

$$z(t) = p(t) \otimes h_{room}(t). \quad (7)$$

Accordingly, the audio processing algorithm $p(t)$ may be mathematically described as:

$$p(t) = z(t) \otimes h_{room}^{-1}(t) \quad (8)$$

In some cases, determining the audio processing algorithm may involve determining one or more parameters for the audio processing algorithm (i.e. coefficients for $p(t)$). For instance, the audio processing algorithm may include certain signal amplification gains at certain corresponding frequencies of the audio signal. As such, parameters indicating the certain signal amplification and/or the certain corresponding frequencies of the audio signal may be identified to determine the audio processing algorithm $p(t)$.

At block 510, the method 500 involves causing to be stored in a database, an association between the audio processing algorithm and the acoustic characteristic of the playback zone. As such, an entry that includes the acoustic characteristic of the playback zone $h_{room}(t)$, and the corresponding audio processing algorithm $p(t)$ as determined at block 504 and 506 may be added to the database. In one example, the database may be stored on local memory storage of the computing device. In another example, if the database is stored on another device, the computing device may transmit the audio processing algorithm and acoustic characteristic of the playback zone to the other device to be stored in the database. Other examples are also possible.

As indicated above, the playback zone for which the audio processing algorithm was determined may be a model playback zone used to simulate a listening environment within which the playback device may play audio content, or a room of a user of the playback device. In some cases, the database may include entries generated based on audio signals played and detected within model playback zones as well as entries generated based on audio signals played and detected within a room of a user of a playback device.

FIG. 6A shows an example portion of a database 600 of audio processing algorithms, within which the audio processing algorithm $p(t)$ determined in the discussions above may be stored. As shown, the portion of the database 600 may include a plurality of entries 602-608. The entry 602 may include a playback zone acoustic characteristic $h_{room}^{-1}(t)-1$. The acoustic characteristic $h_{room}^{-1}(t)-1$ may be a mathematical representation of the acoustic characteristic of a playback zone, as calculated based on an audio signal detected by a playback device and a characteristic of the playback device as described above. Corresponding to the acoustic characteristic $h_{room}^{-1}(t)-1$ in entry 602 may be coefficients $w_1$, $x_1$, $y_1$, and $z_1$ for an audio processing algorithm determined based on the acoustic characteristic $h_{room}^{-1}(t)-1$ and a predetermined audio characteristic, as also described above.

As further shown, entry 604 of the database 600 may include a playback zone acoustic characteristic $h_{room}^{-1}(t)-2$ and processing algorithm coefficients $w_2$, $x_2$, $y_2$, and $z_2$, entry 606 of the database 600 may include a playback zone acoustic characteristic $h_{room}^{-1}(t)-3$ and processing algorithm coefficients $w_3$, $x_3$, $y_3$, and $z_3$, and entry 608 of the database 600 may include a playback zone acoustic characteristic $h_{room}^{-1}(t)-4$ and processing algorithm coefficients $w_4$, $x_4$, $y_4$, and $z_4$.

One having ordinary skill in the art will appreciate that database 600 is just one example of a database that may be populated and maintained by performing the functions of method 500. In one example, the playback zone acoustic characteristics may be stored in a different format or mathematical state (i.e. inversion vs non-inverse functions). In another example, the audio processing algorithms may be stored as function and/or equalization functions. Other examples are also possible.

In one example, some of the functions described above may be performed multiple times for the same playback device in the same playback zone to determine the acoustic characteristic of the playback zone $h_{room}(t)$ and the corresponding processing algorithm p(t). For instance, blocks 502-506 may be performed multiple times to determine a plurality of acoustic characteristics of the playback zone. A combined (i.e. averaged) acoustic characteristic of the playback zone may be determined from the plurality of acoustic characteristics, and the corresponding processing algorithm p(t) may be determined based on the combined acoustic characteristic of the playback zone. An association between the corresponding processing algorithm p(t) and the acoustic characteristic of the playback zone $h_{room}(t)$ or $h_{room}^{-1}(t)$ may then be stored in the database. In some cases, the first audio signal played by the playback device in the playback zone may be substantially the same audio signal during each of the iterations of the functions. In some other cases, the first audio signal played by the playback device in the playback zone may be a different audio signal for some or each of the iterations of the functions. Other examples are also possible.

The method 500 as described above (or some variation of the method 500) may further be performed to generate other entries in the database. For instance, given that the playback device is a first playback device, the playback zone is a first playback zone, and the audio processing algorithm is a first audio processing algorithm, the method 500 may additionally or alternatively be performed using a second playback device in a second playback zone. In one example, the second playback device may play a fourth audio signal in the second playback zone and a microphone of the second playback device may detected a fifth audio signal that includes a portion of the fourth audio signal played by the second playback device. The computing device may then receive data indicating the fifth audio signal and determine an acoustic characteristic of the second playback zone based on the fifth audio signal and a characteristic of the second playback device.

Based on the acoustic characteristic of the second playback zone, the computing device may determine a second audio processing algorithm such that applying of the determined second audio processing algorithm by the second playback device when playing the fourth audio signal in the playback zone produces a sixth audio signal having an audio characteristic substantially the same as the predetermined audio characteristic, represented by the predetermined audio signal z(t) shown in equations (7) and (8). The computing device may then cause to be stored in the database, an association between the second audio processing algorithm and the acoustic characteristic of the second playback zone.

While many playback zones may be similar in dimension, building material, and/or furniture types and arrangements, it is unlikely that two playback zones will have the same exact playback zone acoustic characteristic. As such, rather than storing an individual entry for each unique playback zone acoustic characteristic and their respective corresponding audio processing algorithms, which may require an impractical amount of memory storage, entries for similar or substantially the same playback zone acoustic characteristics may be combined.

In one case, acoustic characteristics of two playback zones may be similar when the two playback zones are substantially similar rooms. In another case, the computing device may, as suggested above, be performing the method 500 for the same playback device in the same playback zone multiple times. In a further case, the computing device may be performing method 500 for a different playback device in the same playback zone. In yet another case, the computing device may be performing method 500 for the playback device in the same playback zone, but in a different location within the playback zone. Other examples are also possible.

Whichever the case, during the process of generating entries of playback zone acoustic characteristic and corresponding audio processing algorithms, the computing device may determine that two playback zones have substantially the same playback zone acoustic characteristics. The computing device may then responsively determine a third audio processing algorithm based on the first audio processing algorithm and the second audio processing algorithm. For example, the computing device may determine the third audio processing algorithm by taking an average of the parameters of the first and second audio processing algorithms.

The computing device may then store in the database, an association between the third audio processing algorithm and the substantially the same acoustic characteristics. In one example, the database entry for the third audio processing algorithm may have a corresponding acoustic characteristic determined based on an average of the two substantially the same acoustic characteristics. In some cases, as suggested above, the database may have only one entry for the substantially the same acoustic characteristics in the interest of conserving storage memory. As such, the entries for the acoustic characteristics of the first playback zone and the second playback zone may be discarded in favor of the entry for the third audio processing algorithm. Other examples are also possible.

While the discussions above generally refer to the method 500 as being performed by a computing device, one having ordinary skill in the art will appreciate that, as indicated above, the functions of method 500 may alternatively be performed by one or more other devices, such as one or more servers, one or more playback devices, and/or one or more controller devices. In other words, one or more of the blocks 502-510 may be performed by the computing device, while one or more others of the blocks 502-510 may be performed by one or more other computing devices.

In one example, as described above, playback of the first audio signal by the playback device at block 502 may be performed by the playback device without any external command. Alternatively, the playback device may play the first audio signal in response to a command from a controller device and/or another playback device. In another example, blocks 502-506 may be performed by one or more playback devices or one or more controller devices, and the computing device may perform block 508 and 510. In yet another example, blocks 502-508 may be performed by one or more playback devices or one or more controller devices, and the computing device may only perform the functions of storing the audio processing algorithm at block 510. Other examples are also possible.

b. Example Database of Audio Processing Algorithms and Corresponding One or More Characteristics of Playback Zones As indicated previously, a playback zone may have one or more playback zone characteristics. The one or more playback zone characteristics may include an acoustic characteristic of the playback zone, as discussed above. The one or more characteristics of the playback zone may also include one or more of a (a) a dimension of the playback zone, (b) an audio reflectivity characteristic of the playback zone (c)

an intended use of the playback zone, (d) a number of furniture in the playback zone, (e) size of furniture in the playback zone, and (f) types of furniture in the playback zone. In one case, the audio reflectivity characteristic of the playback zone may be related to flooring and/or wall materials of the playback zone.

Figure 7:
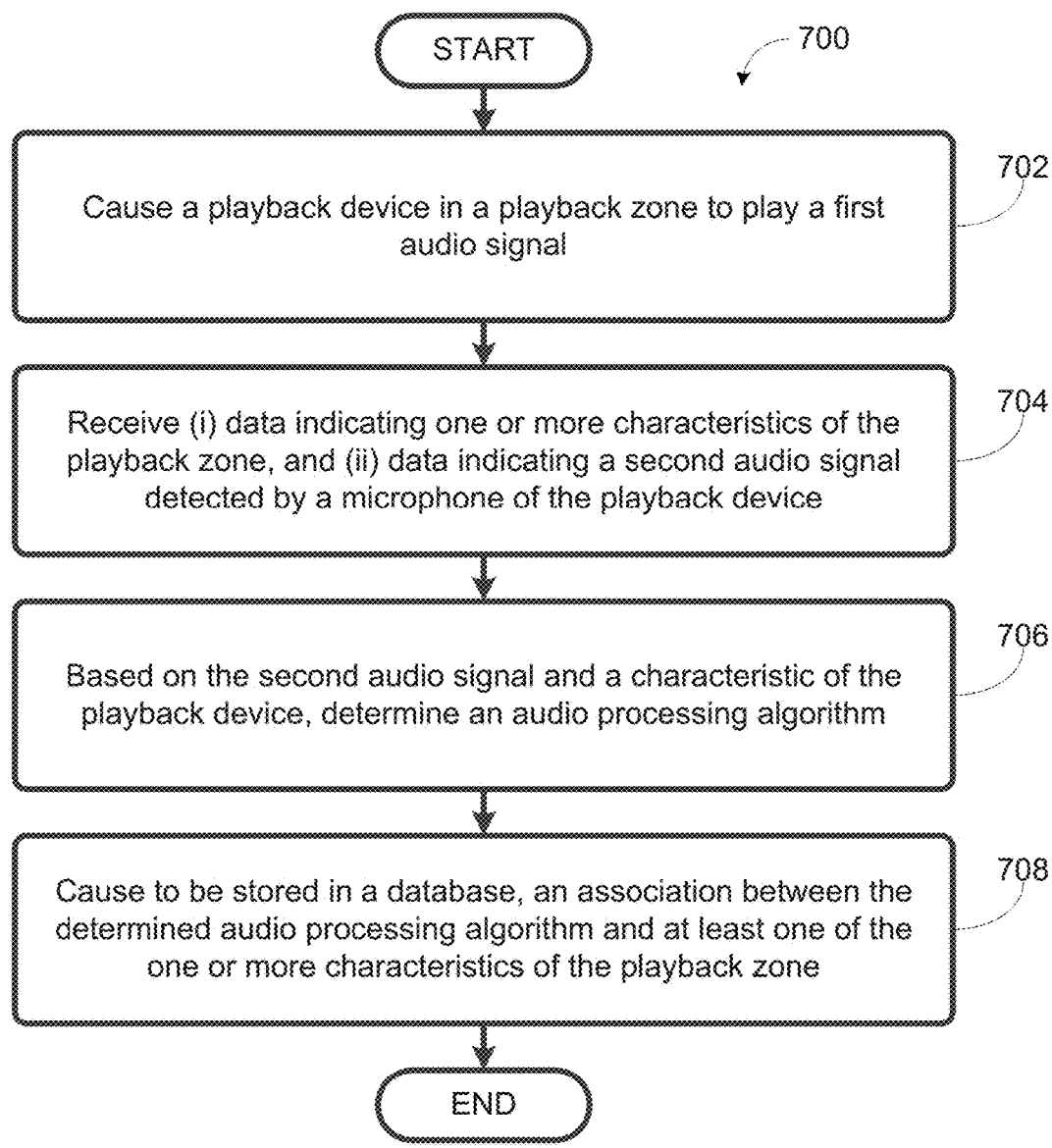
FIG. 7 show an example flow diagram of a second method for maintaining a database of audio processing algorithms.

In some examples, an association between a determined audio processing algorithm, such as p(t) discussed above, and additional one or more characteristics of the playback zone may be stored in the database. FIG. 7 shows an example flow diagram of a method 700 for maintaining a database of audio processing algorithms and the one or more characteristics of the playback zone. Method 700 shown in FIG. 7 presents an embodiment of a method that can be implemented within an operating environment involving, for example, the media playback system 100 of FIG. 1, one or more of the playback device 200 of FIG. 2, and one or more of the control device 300 of FIG. 3. In one example, the method 700 may be performed by a computing device that is in communication with a media playback system, such as the media playback system 100. In another example, some or all of the functions of method 700 may alternatively be performed by one or more other computing devices, such as one or more servers, one or more playback devices, and/or one or more controller devices.

Method 700 may include one or more operations, functions, or actions as illustrated by one or more of blocks 702-708. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

As shown in FIG. 7, the method 700 involves causing a playback device in a playback zone to play a first audio signal at block 702, receiving (i) data indicating one or more characteristics of a playback zone, and (ii) data indicating a second audio signal detected by a microphone of the playback device at block 704, based on the second audio signal and a characteristic of the playback device, determining an audio processing algorithm at block 706, and causing to be stored in a database, an association between the determined audio processing algorithm and at least one of the one or more characteristics of the playback zone at block 708.

At block 702, the method 700 involves the computing device causing a playback device in a playback zone to play a first audio signal. In one example, block 702 may include the same, or substantially the same functions as that of block 502 described in connection to FIG. 5. For instance, the first audio signal may include audio content with frequencies substantially covering a renderable frequency range of the playback device or a frequency range audible to a human. As such, any discussions above in connection to block 502 may also be application to block 702.

At block 704, the method 700 involves receiving (i) data indicating one or more characteristics of the playback zone, and (ii) data indicating a second audio signal detected by a microphone of the playback device. In one example, block 704 may include the same, or substantially the same functions as that of block 504 described in connection to FIG. 5. For instance, the second audio signal may include a portion corresponding to the first audio signal played by the playback device. As such, any discussions above in connection to block 504 may also be applicable to block 704.

In addition to that described previously in connection to block 504, block 704 also involves receiving data indicating one or more characteristics of the playback zone. As indicated above, the playback zone may be a model playback zone used to simulate a listening environment within which the playback device may play audio content. In such a case, some of the one or more playback zone characteristics for the playback zone may be known. For instance, dimensions, floor plan, construction materials, and furnishings for the playback zone may be known. In one case, model playback zones may be constructed for the purposes of determining audio processing algorithms for a database, in which case, some of the one or more playback zone characteristics may be predetermined. In another case, the playback zone may be a room of a user of the playback device. As indicated above, such characteristics of the playback zone may contribute to the acoustic characteristic of the playback zone.

In one example, the computing device may receive the data indicating the one or more playback zone characteristics via a controller interface of a controller devices used by a user or an acoustics engineer. In another example, the computing device may receive the data indicating the one or more characteristics of the playback zone from the playback device in the playback zone. For instance, the data indicating the one or more characteristics may be received along with data indicating the second audio signal. The data indicating the one or more playback zone characteristics may be received before, during, or after playback of the first audio signal by the playback device at block 702. Other examples are also possible.

At block 706, the method 700 involves based on the second audio signal and a characteristic of the playback device, determining an audio processing algorithm. In one example, block 706 may include the same or similar functions as that described above in blocks 506 and 508 of FIG. 5. For instance, determining the audio processing algorithm may involve based on the second audio signal and a characteristic of the playback device, determining an acoustic characteristic of the playback zone, then based on the acoustic characteristic of the playback zone, determine an audio processing algorithm. The characteristic of the playback device, as indicated above, may include one or more of an acoustic characteristic of the playback device, specifications of the playback device, and a model of the playback device.

As discussed previously, application of the determined audio processing algorithm by the playback device when playing the first audio signal in the playback zone may produce a third audio signal having an audio characteristic substantially the same as a predetermined audio characteristic, or assumes the predetermined audio characteristic, at least to some extent. In one case, the predetermined audio characteristic may be the same or substantially the same as the predetermined audio characteristic represented as the predetermined audio signal p(t) discussed above. Other examples are also possible.

At block 708, the method 800 involves causing to be stored in a database, an association between the determined audio processing algorithm and at least one of the one or more characteristics of the playback zone. In one example, block 708 may include the same or similar functions as that described above in blocks 510. In this case however, the computing device may cause to be stored in the database, an association between the audio processing algorithm and at least one of the one or more characteristics in addition to, or instead of the acoustic characteristic of the playback zone.

As indicated above, the playback zone for which the audio processing algorithm was determined may be a model playback zone used to simulate a listening environment within which the playback device may play audio content, or a room of a user of the playback device. In some cases, the database may include entries generated based on audio signals played and detected within model playback zones as well as entries generated based on audio signals played and detected within a room of a user of a playback device.

FIG. 6B shows an example portion of a database 650 of audio processing algorithms, within which the audio processing algorithm and associations between the audio processing algorithms and playback zone acoustic characteristics determined in the discussions above may be stored. As shown, the portion of the database 650 may include a plurality of entries 652-658, similar to the entries 602-608 of the database 600. For instance, entries 652 and 602 may have the same playback zone acoustic characteristic, and the same audio processing algorithm coefficients, entries 654 and 604 may have the same playback zone acoustic characteristic, and the same audio processing algorithm coefficients, entries 656 and 606 may have the same playback zone acoustic characteristic, and the same audio processing algorithm coefficients, and entries 658 and 608 may have the same playback zone acoustic characteristic, and the same audio processing algorithm coefficients.

In addition to the playback zone acoustic characteristics, the database 650 may also include zone dimensions information, indicating dimensions of the playback zone having the corresponding playback zone acoustic characteristic and the audio processing algorithm determined based on the corresponding playback zone acoustic characteristic. For instance, as shown, the entry 652 may have a zone dimension of $a_1 \times b_1 \times c_1$, the entry 654 may have a zone dimension of $a_2 \times b_2 \times c_2$, the entry 656 may have a zone dimension of $a_3 \times b_3 \times c_3$, and the entry 654 may have a zone dimension of $a_4 \times b_4 \times c_4$. As such, in this example, the one or more characteristics stored in association with the determined audio processing algorithm include the acoustic characteristic of the playback zone and dimensions of the playback zone. Other examples are also possible.

One having ordinary skill in the art will appreciate that database 650 is just one example of a database that may be populated and maintained by performing the functions of method 700. In one example, the playback zone acoustic characteristics may be stored in a different format or mathematical state (i.e. inversion vs non-inverse functions). In another example, the audio processing algorithms may be stored as function and/or equalization functions. In yet another example, the database 650 may include only zone dimensions and corresponding audio processing algorithms, and not the corresponding acoustic characteristics of the playback zone. Other examples are also possible.

Similar to method 500, the method 700 as described above (or some variation of the method 700) may further be performed to generate other entries in the database. For instance, given that the playback device is a first playback device, the playback zone is a first playback zone, and the audio processing algorithm is a first audio processing algorithm, the method 600 may additionally or alternatively be performed using a second playback device in a second playback zone. In one example, the second playback device may play a fourth audio signal in the second playback zone and a microphone of the second playback device may detect a fifth audio signal that includes a portion of the fourth audio signal played by the second playback device. The computing device may then receive (i) data indicating one or more characteristics of the second playback zone, and (ii) data indicating the fifth audio signal detected by a microphone of a second playback device in the second playback zone.

The computing device may then determine an acoustic characteristic of the second playback zone based on the fifth audio signal and a characteristic of the second playback device. Based on the acoustic characteristic of the second playback zone, the computing device may determine a second audio processing algorithm such that applying of the determined second audio processing algorithm by the second playback device when playing the fourth audio signal in the playback zone produces a sixth audio signal having an audio characteristic substantially the same as the predetermined audio characteristic, represented by the predetermined audio signal z(t) shown in equations (7) and (8). The computing device may then cause to be stored in a database, an association between the second audio processing algorithm and at least one of the one or more characteristics of the second playback zone.

Similar to that discussed above in connection to the method 500, during the process of generating entries for the database, the computing device may determine that two playback zones have similar or substantially the same playback zone acoustic characteristics. Accordingly, as also discussed above, the computing device may combine the playback zone acoustic characteristics and determined audio processing algorithms corresponding to the playback zone acoustic characteristics (i.e. by averaging), and store the combined playback zone acoustic characteristic and combined audio processing algorithm as a single entry in the database. Other examples are also possible.

Similar to the case of method 500, while the discussions above generally refer to the method 700 as being performed by a computing device, one having ordinary skill in the art will appreciate that the functions of method 700 may alternatively be performed by one or more other computing devices, such as one or more servers, one or more playback devices, and/or one or more controller devices. In other words, one or more of the blocks 702-708 may be performed by the computing device, while one or more others of the blocks 702-708 may be performed by one or more other computing devices. The other computing devices may include one or more playback devices, one or more controller devices, and/or one or more servers.

In one example, as described above, playback of the first audio signal by the playback device at block 702 may be performed by the playback device without any external command. Alternatively, the playback device may play the first audio signal in response to a command from a controller device and/or another playback device. In another example, blocks 702-706 may be performed by one or more playback devices or one or more controller devices, and the computing device may perform block 708. Other examples are also possible.

IV. Calibrating a Playback Device Based on Playback Zone Characteristics

As indicated above, some examples described herein involve calibrating a playback device for a playback zone. In some cases, calibration of the playback deice may involve determining an audio processing algorithm for the playback device to apply when playing audio content in the playback zone.

Figure 8:
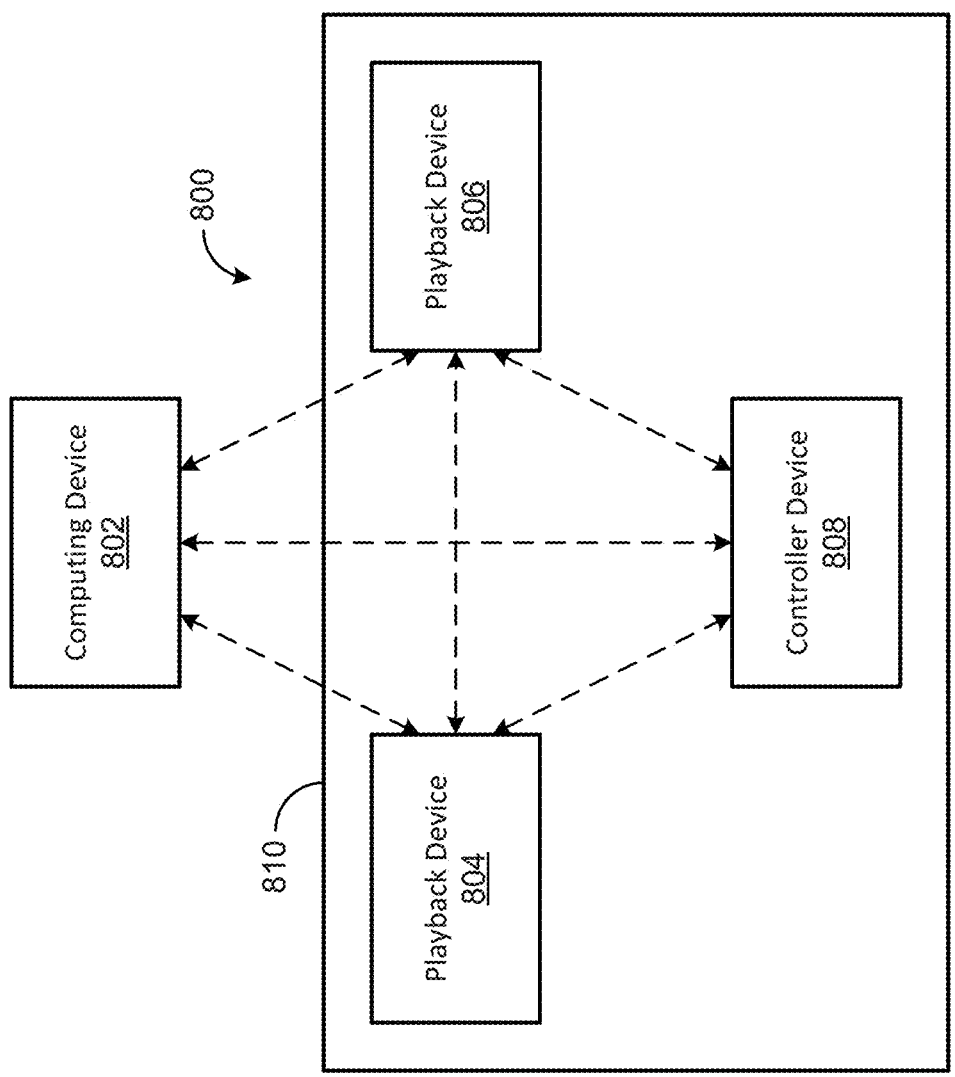
FIG. 8 shows an example playback zone within which a playback device may be calibrated.

FIG. 8 shows an example playback environment 800 within which a playback device may be calibrated. As shown, the playback environment 800 includes a computing device 802, playback devices 804 and 806, controller device 808, and a playback zone 810. Playback devices 804 and 806 may be similar to the playback device 200 shown in FIG. 2. As such, playback devices 804 and 806 may each have a microphone, such as the microphone 220. In some cases, only one of the playback devices 804 and 806 may have a microphone.

In one example, playback devices 804 and 806 may be part of a media playback system and may be configured to play audio content in synchrony, such as that shown and discussed above in connection to the media playback system 100 of FIG. 1. In one case, playback devices 804 and 806 may be grouped together to play audio content in synchrony within the playback zone 810. Referring again to FIG. 1, the playback zone 810 may be any one or more of the different rooms and zone groups in the media playback system 100. For instance, the playback zone 810 may be the master bedroom. In such a case, the playback devices 804 and 806 may correspond to the playback devices 122 and 124, respectively.

In one example, the controller device 808 may be a device that can be used to control the media playback system. In one case, the controller device 808 may be similar to the control device 300 of FIG. 3. While the controller device 808 of FIG. 8 is shown to be inside the playback zone 810, the controller device 808 may be outside of the playback zone 810, or moving in or out of the playback zone 810 while communicating with the playback device 804, the playback device 806, and or any other device in the media playback system.

In one example, the computing device 802 may be a server in communication with the media playback system. The computing device 802 may be configured to maintain a database of information associated with the media playback system, such as registration numbers associated with the playback devices 804 and 806. The computing device 802 may also be configured to maintain a database of audio processing algorithms, as described in the previous section. Other examples are also possible.

Figure 9:
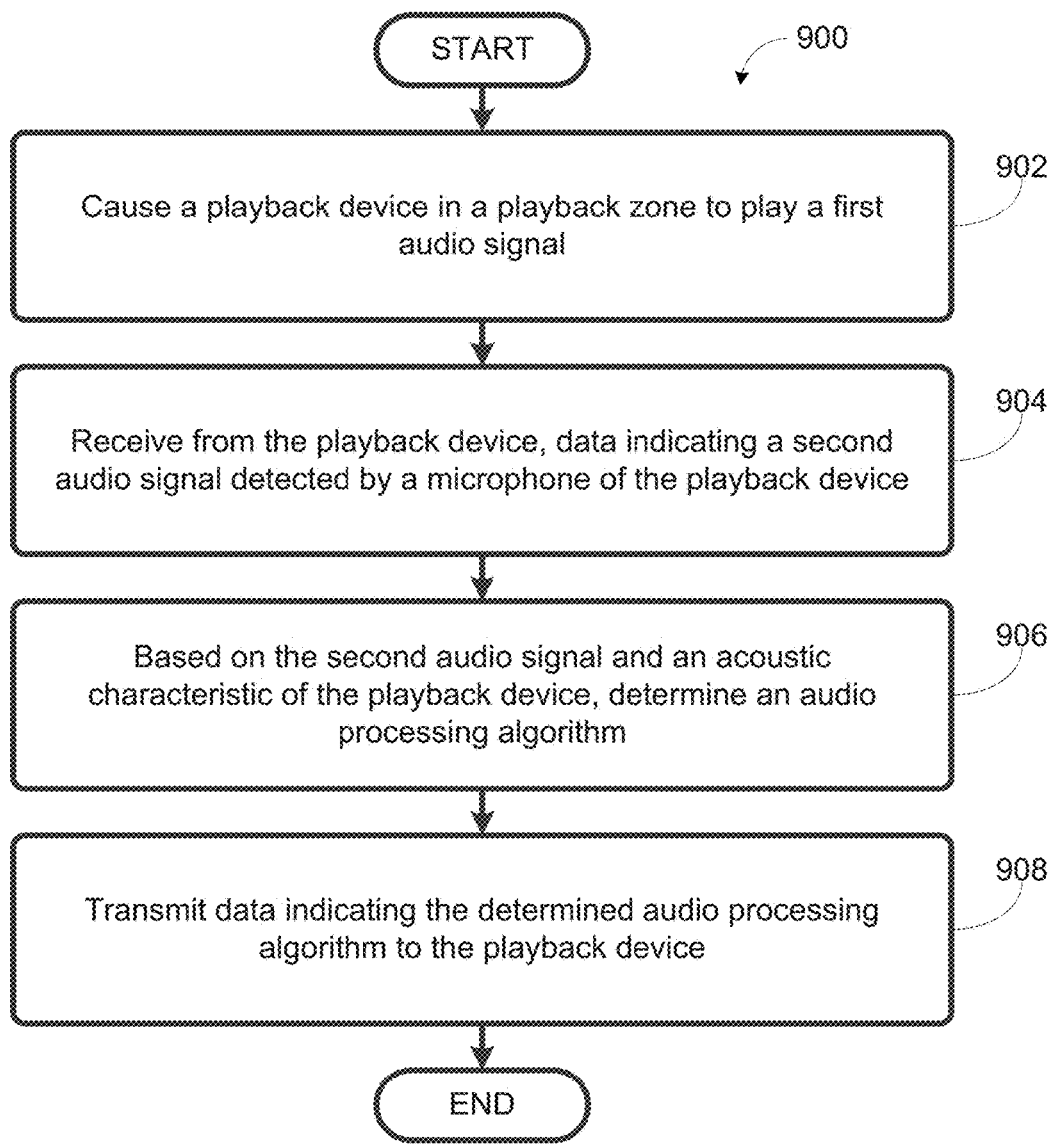
FIG. 9 shows an example flow diagram of a first method for determining an audio processing algorithm based on one or more playback zone characteristics.

Methods 900, 1000, and 1100, as will be discussed below provide functions that may be performed for calibration of a playback device in a playback zone, such as the playback devices 804 and 806 in the playback zone 810.

a. First Example Method for Determining an Audio Processing Algorithm Based on a Detected Audio Signal FIG. 9 shows an example flow diagram of a method 900 for determining an audio processing algorithm based on one or more playback zone characteristics. Method 900 shown in FIG. 9 presents an embodiment of a method that can be implemented within an operating environment involving, for example, the media playback system 100 of FIG. 1, one or more of the playback device 200 of FIG. 2, one or more of the control device 300 of FIG. 3, and the playback environment 800 of FIG. 8. In one example, the method 900 may be performed by a computing device in communication with a media playback system. In another example, some or all of the functions of method 900 may alternatively be performed by one or more other computing devices, such as one or more servers, one or more playback devices, and/or one or more controller devices associated with the media playback system.

Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

As shown in FIG. 9, the method 900 involves a causing a playback device in a playback zone to play a first audio signal at block 902, receiving from the playback device, data indicating a second audio signal detected by a microphone of the playback device at block 904, based on the second audio signal and an acoustic characteristic of the playback device, determining an audio processing algorithm at block 906, and transmitting data indicating the determined audio processing algorithm to the playback device at block 908.

At block 902, the method 900 involves causing a playback device in a playback zone to play a first audio signal. Referencing FIG. 8, the playback device may be the playback device 804, and the playback zone may be the playback zone 810. As such, the playback device may be a playback device similar to the playback device 200 shown in FIG. 2.

In one example, the computing device 802 may determine that the playback device 804 is to be calibrated for the playback zone 810, and responsively cause the playback device 804 in the playback zone 810 to play the first audio signal. In one case, the computing device 802 may determine that the playback device 804 is to be calibrated based on an input received from a user indicating that the playback device 804 is to be calibrated. In one instance, the input may be received from the user via the controller device 808. In another case, the computing device 802 may determine that the playback device 804 is to be calibrated because the playback device 804 is a new playback device, or newly moved to the playback zone 810. In a further case, calibration of the playback device 804 (or any other playback devices in the media playback system) may be performed periodically. As such, the computing device 802 may determine that the playback device 804 is to be calibrated based on a calibration schedule of the playback device 804. Other examples are also possible. Responsive to determining that the playback device 804 is to be calibrated, the computing device 802 may then cause the playback device 804 to play the first audio signal.

While block 902 involves the computing device 802 causing the playback device 804 to play the first audio signal, one having ordinary skill in the art will appreciate that playback of the first audio signal by the playback device 804 may not necessarily be caused or initiated by the computing device 802. For instance, the controller device 808 may send a command to the playback device 804 to cause the playback device 804 to play the first audio signal. In another instance, the playback device 806 may cause the playback device 804 to play the first audio signal. In a further instance, the playback device 804 may play the first audio signal without receiving a command from the computing device 802, playback device 806, or controller device 808. In one example, the playback device 804 may determine, based on a movement of the playback device 804, or a change in the playback zone of the playback device 804, that a calibration is to be performed, and responsive play the first audio signal. Other examples are also possible.

As suggested, the first audio signal may be a test signal or measurement signal for calibrating the playback device 804 for the playback one 810. As such, the first audio signal may be representative of audio content that may be played by the playback device during regular use by a user. Accordingly, the first audio signal may include audio content with frequencies substantially covering a renderable frequency range of the playback device or a frequency range audible to a human. In another example, the first audio signal may be a favorite or commonly played audio track of a user of the playback device.

At block 904, the method 900 involves receiving from the playback device, a second audio signal detected by a microphone of the playback device. Continuing with the examples above, given the playback device 804 is similar to the playback device 200 of FIG. 2, the microphone of the playback device 804 may be similar to the microphone 220 of the playback device 200. In one example, the computing device 802 may receive the data from the playback device 804. In another example, the computing device 804 may receive the data via another playback device such as the playback device 806, a controller device such as the controller device 808, or another computing device, such as another server.

While the playback device 804 is playing the first audio signal, or shortly thereafter, the microphone of the playback device 804 may detect the second audio signal. The second audio signal may include sounds present in the playback zone. For instance, the second audio signal may include a portion corresponding to the first audio signal played by the playback device 804.

In one example, the computing device 802 may receive data indicating the first audio signal from the playback device 804 as a media stream while the microphone detects the second audio signal. In another example, the computing device 802 may receive from the playback device 804, data indicating the second audio signal once detection of the second audio signal by the microphone of the playback device 804 is complete. In either case, the playback device 804 may process the detected second audio signal (via an audio processing component, such as the audio processing component 208 of the playback device 200) to generate the data indicating the second audio signal, and transmit the data to the computing device 802. In one instance, generating the data indicating the second audio signal may involve converting the second audio signal from an analog signal to a digital signal. Other examples are also possible.

At block 906, the method 900 involves based on the second audio signal and an acoustic characteristic of the playback device, determining an audio processing algorithm. In one example, the acoustic characteristic of the playback device may be $h_p(t)$ as discussed above in connection to block 506 of the method 500 shown in FIG. 5. For instance, as described above, the acoustic characteristic of the playback device may be determined by causing a reference playback device in an anechoic chamber to play a measurement signal, receiving from the reference playback device, data indicating an audio signal detected by a microphone of the reference playback device, and determining the acoustic characteristic of the playback device based on comparison between detected audio signal and the measurement signal.

As suggested above, the reference playback device may be of the same model as the playback device 804 being calibrated for the playback zone 810. Also similar to that discussed above in connection to block 506, the computing device may accordingly determine an acoustic characteristic of the playback zone based on the acoustic characteristic of the playback device and the second audio signal.

In one example, the computing device 802 may determine an audio processing algorithm based on the acoustic characteristic of the playback zone similar to that discussed above in connection to block 508. As such, the computing device 802 may determine the audio processing algorithm based on the acoustic characteristic of the playback zone and a predetermined audio characteristic, such that an application of the determined audio processing algorithm by the playback device 804 when playing the first audio signal in the playback zone 810 may produce a third audio signal having an audio characteristic substantially the same as the predetermined audio characteristic, or assumes the predetermined audio characteristic, at least to some extent.

In another example, the computing device 802 may select from a plurality of audio processing algorithms, an audio processing algorithm corresponding to the acoustic characteristic of the playback zone 810. For instance, the computing device may access a database, such as the databases 600 and 650 of FIGS. 6A and 6B, respectively, and identify an audio processing algorithm based on the acoustic characteristic of the playback zone 810. For instance, referring to the database 600 of FIG. 6A, if the acoustic characteristic of the playback zone 810 is determined as $h_{room}^{-1}(t)-3$, then the audio processing algorithm having coefficients $w_3$, $x_3$, $y_3$, and $z_3$ of database entry 606 may be identified.

In some cases, an acoustic characteristic that exactly matches the determined acoustic characteristic of the playback zone 810 may not be found in the database. In such a case, an audio processing algorithm corresponding to an acoustic characteristic in the database that is the most similar to the acoustic characteristic of the playback zone 810 may be identified. Other examples are also possible.

At block 908, the method 900 involves transmitting data indicating the determined audio processing algorithm to the playback device. Continuing with the examples above, the computing device 802 (or one or more other devices) may transmit the data indicating the determined audio processing algorithm to the playback device 804. The data indicating the determined audio processing algorithm may also include a command to cause the playback device 804 to apply the determined audio processing algorithm when playing audio content in the playback zone 810. In one example, applying the audio processing algorithm to the audio content may modify a frequency equalization of the audio content. In another example, applying the audio processing algorithm to the audio content may modify a volume range of the audio content. Other examples are also possible.

In some cases, a playback zone may include multiple playback devices configured to play audio content in synchrony. For instance, as indicated above, playback devices 804 and 806 may be configured to play audio content in synchrony in the playback zone 810. In such a case, calibration of one of the playback devices may involve the other playback devices.

In one example, a playback zone such as the playback zone 810 may include a first playback device, such as the playback device 804, and a second playback device, such as the playback device 806, configured to play audio content in synchrony. Calibration of the playback device 804, as coordinated and performed by the computing device 802, may involve causing the playback device 804 to play a first audio signal and causing the playback device 806 to play a second audio signal.

In one case, the computing device 802 may cause the playback device 806 to play the second audio signal in synchrony with playback of the first audio signal by the playback device 804. In one instance, the second audio signal may be orthogonal to the first audio signal such that a component of the synchronously played audio content played by either of the playback devices 804 and 806 may be discernable. In another case, the computing device may cause the playback device 806 to play the second audio signal after playback of the first audio signal by the playback device 804 is complete. Other examples are also possible.

The computing device 802 may then receive from the playback device 804, a third audio signal detected by a microphone of the playback device 804, similar to that discussed in connection to block 904. In this case however, the third audio signal may include both a portion corresponding to the first audio signal played by the playback device 804, and a portion corresponding to the second audio signal played by playback device 806.

Based on the third audio signal and an acoustic characteristic of the playback device 804, the computing device 802 may then determine an audio processing algorithm, and transmit data indicating the determined audio processing algorithm to the playback device 804 for the playback device 804 to apply when playing audio content in the playback zone 810, similar to that described above in connection to blocks 906 and 908.

In one case, as indicated above, the playback device 806 may also have a microphone and may also be calibrated similarly to that described above. As indicated, the first audio signal played by the playback device 804 and the second audio signal played by the playback device 806 may be orthogonal, or otherwise discernable. For instance, as also indicated above, the playback device 806 may play the second audio signal after playback of the first audio signal by the playback device 804 is completed. In another instance, the second audio signal may have a phase that is orthogonal to a phase of the first audio signal. In yet another instance, the second audio signal may have a different and/or varying frequency range than the first audio signal. Other examples are also possible.

Whichever the case, discernable first and second audio signals may allow the computing device 802 to parse from the third audio signal detected by the playback device 804, a contribution of the playback device 804 to the detected third audio signal, and a contribution of the playback device 806 to the detected third audio signal. Respective audio processing algorithms may then be determined for the playback device 804 and the playback device 806.

The respective audio processing algorithms may be determined similar to that discussed above in connection to block 508. In one case, a first acoustic characteristic of the playback zone may be determined based on the third audio signal detected by the playback device 604, and a second acoustic characteristic of the playback zone may be determined based on a fourth audio signal detected by the playback device 806. Similar to the third audio signal, the fourth audio signal may also include a portion corresponding to the first audio signal played by the playback device 804 and a portion corresponding to the second audio signal played by the playback device 806.

Respective audio processing algorithms for the playback device 804 and the playback device 806 may then be determined based on the first acoustic characteristic of the playback zone and the second acoustic characteristic of the playback zone either individually or in combination. In some instances, a combination of the first acoustic characteristic of the playback zone and the second acoustic characteristic of the playback zone may represent a more comprehensive acoustic characteristic of the playback zone than either the first or second acoustic characteristic of the playback zone individually. The respective audio processing algorithms may then be transmitted to the playback device 804 and the playback device 806 to apply when playing audio content in the playback zone 810. Other examples are also possible.

While the discussions above generally refer to the method 900 as being performed by the computing device 802 of FIG. 8, one having ordinary skill in the art will appreciate that, as indicated above, the functions of method 900 may alternatively be performed by one or more other computing devices, such as one or more servers, one or more playback devices, and/or one or more controller devices. For instance, the functions of method 900 to calibrate the playback device 804 for the playback zone 810 may be performed by the playback device 804, the playback device 806, the controller device 808, or another device in communication with the playback device 804, but not shown in FIG. 8.

Further, in some cases, one or more of the blocks 902-908 may be performed by the computing device 802, while one or more others of the blocks 902-908 may be performed by one or more other devices. For instance, blocks 902 and 904 may be performed by one or more of the playback device 804, the playback device 806, and the playback device 808. In other words, a coordinating device other than the computing device 802 may coordinate calibration of the playback device 804 for the playback zone 810.

In some cases, at block 906, the coordinating device may transmit the second audio signal to the computing device 802 such that the computing device 802 may determine the audio processing algorithm based on the second audio signal and the acoustic characteristic of the playback device. The acoustic characteristic of the playback device may be provided to the computing device 802 by the coordinating device, or provided from another device on which characteristics of the playback device is stored. In one case, the computing device 802 may perform the calculations of block 906 because the computing device 802 has more processing power than the coordinating device.

In one example, upon determining the audio processing algorithm, the computing device 802 may transmit the determined audio processing algorithm directly to the playback device 804 for the playback device 804 to apply when playing audio content in the playback zone 810. In another example, upon determining the audio processing algorithm, the computing device 802 may transmit the determined audio processing algorithm to the coordinating device, and the coordinating device may perform block 908 and transmit the determined processing algorithm to the playback device 804 (if the coordinating device is not also the playback device 804). Other examples are also possible.

b. Second Example Methods for Determining an Audio Processing Algorithm Based on a Detected Audio Signal In some cases, as described above, calibration of a playback device in a playback zone may be coordinated and performed by a computing device such as a server, or a controller device. In some other cases, as also described above, calibration of a playback device may be coordinated and/or performed by the playback device being calibrated.

Figure 10:
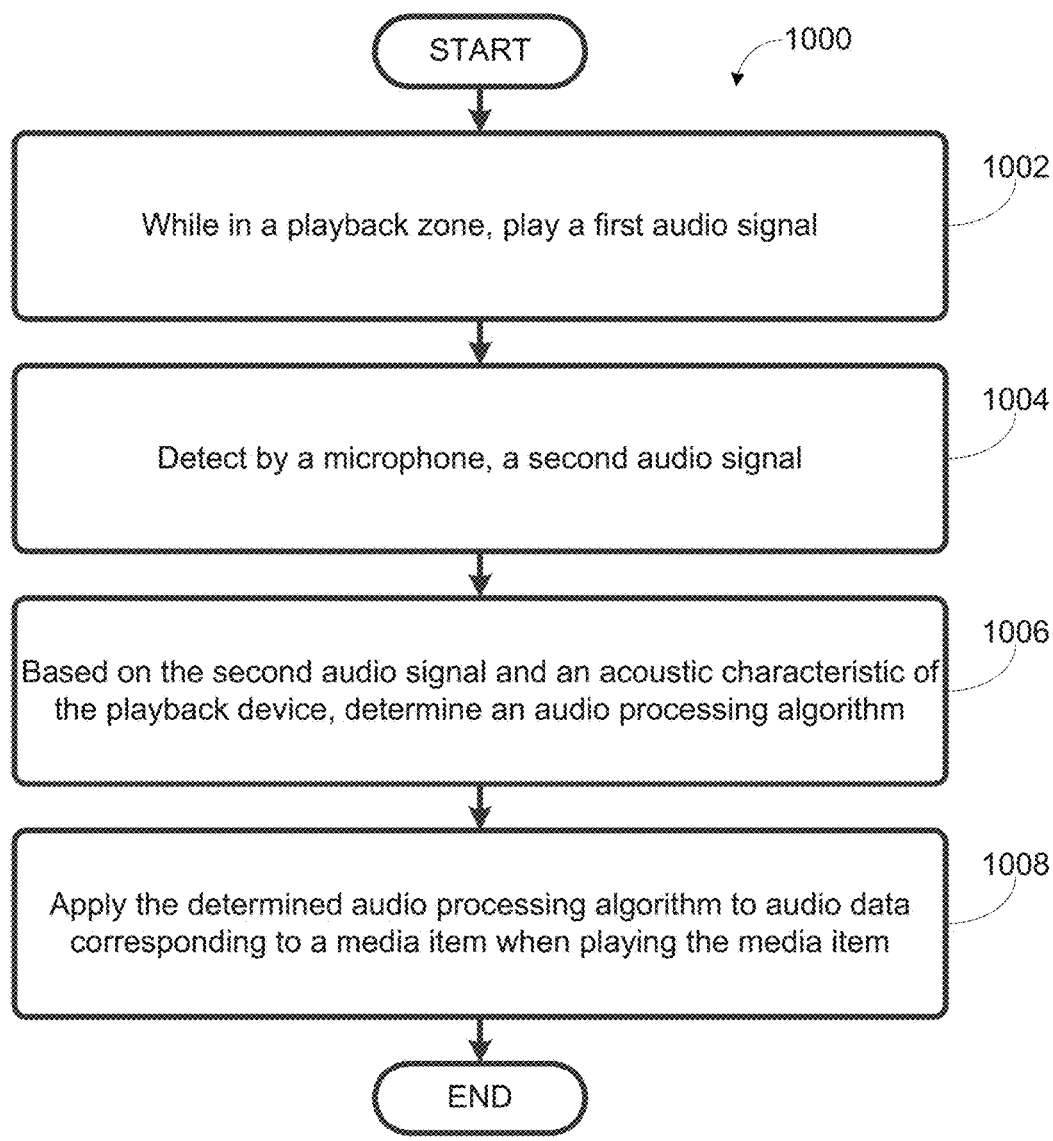
FIG. 10 shows an example flow diagram of a second method for determining an audio processing algorithm based on one or more playback zone characteristics.

FIG. 10 shows an example flow diagram of a method 1000 for determining an audio processing algorithm based on one or more playback zone characteristics, as performed by the playback device being calibrated. Method 1000 shown in FIG. 10 presents an embodiment of a method that can be implemented within an operating environment involving, for example, the media playback system 100 of FIG. 1, one or more of the playback device 200 of FIG. 2, one or more of the control device 300 of FIG. 3, and the playback environment 800 of FIG. 8. As indicated, method 800 may be performed by the playback device to be calibrated for a playback zone. In some cases, some of the functions of method 1000 may alternatively be performed by one or more other computing devices, such as one or more servers, one or more other playback devices, and/or one or more controller devices.

Method 1000 may include one or more operations, functions, or actions as illustrated by one or more of blocks 1002-1008. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

As shown in FIG. 10, the method 1000 involves while in a playback zone, playing a first audio signal at block 1002, detecting by a microphone, a second audio signal at block 1004, based on the second audio signal and an acoustic characteristic of the playback device, determining an audio processing algorithm at block 1006, and applying the determined audio processing algorithm to audio data corresponding to a media item when playing the media item at block 1008.

At block 1002, the method 1000 involves while in a playback zone, playing a first audio signal. Referring to FIG. 8, the playback device performing method 1000 may be the playback device 804, while the playback device 804 is in the playback zone 810. In one example, block 1002 may be similar to block 902, but performed by the playback device 804 being calibrated rather than the computing device 802. Nevertheless, any discussions above in connection to block 902 may also be applicable, sometimes with some variation, to block 1002.

At block 1004, the method 1000 involves detecting by a microphone, a second audio signal. The second audio signal may include a portion corresponding to the first audio signal played by the playback device. In one example, block 1004 may be similar to block 904, but performed by the playback device 804 being calibrated rather than the computing device 802. Nevertheless, any discussions above in connection to block 904 may also be applicable, sometimes with some variation, to block 1004.

At block 1006, the method 1000 involves based on the second audio signal and an acoustic characteristic of the playback device, determining an audio processing algorithm. In one example, block 1006 may be similar to block 906, but performed by the playback device 804 being calibrated rather than the computing device 802. Nevertheless, any discussions above in connection to block 906 may also be applicable, sometimes with some variation, to block 1006.

In one case, functions for determining the audio processing algorithm, as discussed in connection to block 906, may be performed wholly by the playback device 804 that is being calibrated for the playback zone 810. As such, the playback device 804 may determine an acoustic characteristic of the playback zone 610 based on the second audio signal and an acoustic characteristic of the playback device 804. In one case, the playback device 804 may have stored locally, the acoustic characteristic of the playback device 804. In another case, the playback device 804 may receive from another device, the acoustic characteristic of the playback device 804.

In one example, the playback device 804 may then select from a plurality of audio processing algorithms, an audio processing algorithm corresponding to the acoustic characteristic of the playback zone 610. For instance, the playback device 804 may access a database such the databases 600 and 650 shown in and described above in connection to FIGS. 6A and 6B, respectively, and identify in the database an audio processing algorithm corresponding to an acoustic characteristic substantially similar to the acoustic characteristic of the playback zone 610.

In another example, similar to functions described above in connection to block 906 of the method 900 and/or block 508 of the method 500, the playback device 804 may calculate the audio processing algorithm based on the acoustic characteristics of the playback zone 610 and a predetermined audio characteristic, such that an application of the determined audio processing algorithm by the playback device 804 when playing the first audio signal in the playback zone 810 may produce a third audio signal having an audio characteristic substantially the same as the predetermined audio characteristic, or assumes the predetermined audio characteristic, at least to some extent.

In a further example, as discussed in previous section, another device other than the playback device 804 may perform some or all of the functions of block 1006. For instance, the playback device 804 may transmit data indicating the detected second audio signal to a computing device, such as the computing device 802, another playback device such as the playback device 806, a controller device such as the controller device 808, and/or some other device in communication with the playback device 804, and request an audio processing algorithm. In another instance, the playback device 804 may determine the acoustic characteristic of the playback zone 810 based on the detected audio signal, and transmit data indicating the determined acoustic characteristic of the playback zone 810 to the other device with a request for an audio processing algorithm based on the determined acoustic characteristic of the playback zone 810.

In other words, in one aspect, the playback device 804 may determine the audio processing algorithm by requesting from the other device, an audio processing algorithm based on the detected second audio signal and/or acoustic characteristic of the playback zone 810 provided to the other device by the playback device 804

In a case where the playback device 804 provides data indicating the detected second audio signal but not the acoustic characteristic of the playback zone 810, the playback device 804 may also transmit the acoustic characteristic of the playback device 804 along with the data indicating the detected second audio signal such that the other device may determine the acoustic characteristic of the playback zone 810. In another case, the device receiving the data indicating the detected second audio signal may determine based on the data, a model of the playback device 804 transmitting the data, and determine an acoustic characteristic of the playback device 804 based on the model of the playback device 804 (i.e. a playback device acoustic characteristic database). Other examples are also possible.

The playback device 804 may then receive the determined audio processing algorithm. In one case, the playback device 804 may send the second audio signal to the other device because the other device has more processing power than the playback device 804. In another case, the playback device 804 and one or more other devices may perform the calculations and functions in parallel for an efficient use of processing power. Other examples are also possible.

At block 1008, the method 800 involves applying the determined audio processing algorithm to audio data corresponding to a media item when playing the media item. In one example, application of the audio processing algorithm to the audio data of the media item by the playback device 804 when playing the media item in the playback zone 810 may modify a frequency equalization of the media item. In another example, application of the audio processing algorithm to the audio data of the media item by the playback device 804 when playing the media item in the playback zone 810 may modify a volume range of the media item. In one example, the playback device 804 may store in local memory storage, the determined audio processing algorithm and apply the audio processing algorithm when playing audio content in the playback zone 810.

In one example, the playback device 804 may be calibrated for different configurations of the playback device 804. For instance, the playback device 804 may be calibrated for a first configuration involving individual playback in the playback zone 810, as well as for a second configuration involving synchronous playback with the playback device 806 in the playback zone 810. In such a case, a first audio processing algorithm determined, stored, and applied for the first playback configuration of the playback device, and a second audio processing algorithm determined, stored, and applied for the second playback configuration of the playback device.

The playback device 804 may then determine based on a playback configuration the playback device 804 is in at a given time, which audio processing algorithm to apply when playing audio content in the playback zone 810. For instance, if the playback device 804 is playing audio content in the playback zone 810 without the playback device 806, the playback device 804 may apply the first audio processing algorithm. On the other hand, if the playback device 804 is playing audio content in the playback zone 810 in synchrony with the playback device 806, the playback device 804 may apply the second audio processing algorithm. Other examples are also possible.

c. Example Method for Determining an Audio Processing Algorithm Based on Playback Zone Characteristics In the discussions above, determination of an audio processing algorithm may be generally based on determining an acoustic characteristic of the playback zone, as determined based on an audio signal detected by a playback device in the playback zone. In some cases, an audio processing algorithm may also be identified based on other characteristics of the playback zone, in addition to or instead of the acoustic characteristic of the playback zone.

Figure 11:
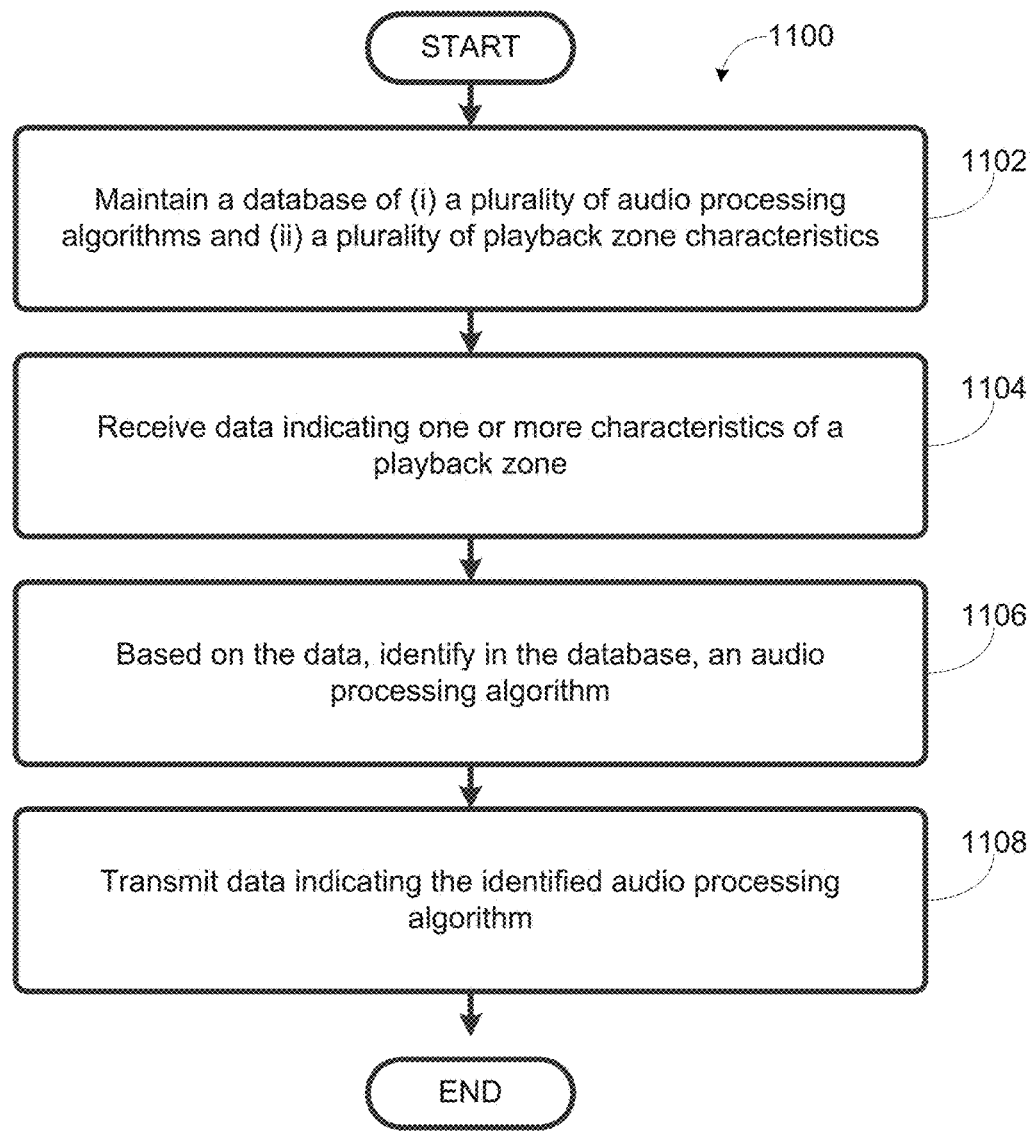
FIG. 11 shows an example flow diagram for identifying an audio processing algorithm from a database of audio processing algorithms.

FIG. 11 shows an example flow diagram for providing an audio processing algorithm from a database of audio processing algorithms based on one or more characteristics of the playback zone. Method 1100 shown in FIG. 11 presents an embodiment of a method that can be implemented within an operating environment involving, for example, the media playback system 100 of FIG. 1, one or more of the playback device 200 of FIG. 2, one or more of the control device 300 of FIG. 3, and the playback environment 800 of FIG. 8. In one example, method 1100 may be performed, either individually or collectively by one or more playback devices, one or more controller devices, one or more servers, or one or more computing devices in communication with the playback device to be calibrated for the playback zone.

Method 1100 may include one or more operations, functions, or actions as illustrated by one or more of blocks 1102-1108. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

As shown in FIG. 11, the method 1100 involves maintaining a database of (i) a plurality of audio processing algorithms and (ii) a plurality of playback zone characteristics at block 1102, receiving data indicating one or more characteristics of a playback zone at block 1104, based on the data, identifying in the database, and audio processing algorithm at block 1106, and transmitting data indicating the identified audio processing algorithm at block 1108.

At block 1102, the method 1100 involves maintaining a database of (i) a plurality of audio processing algorithms and (ii) a plurality of playback zone characteristics. In one example, the database may be similar to the databases 600 and 650 as shown in and described above in connection to FIGS. 6A and 6B, respectively. As such, each audio processing algorithm of the plurality of audio processing algorithms may correspond to one or more playback zone characteristics of the plurality of playback zone characteristics. Maintenance of the database may be as described above in connection to the methods 500 and 700 of FIGS. 5 and 7, respectively. As discussed above, the database may or may not be stored locally on the device maintaining the database.

At block 1104, the method 1100 involves receiving data indicating one or more characteristics of a playback zone. In one example, the one or more characteristics of the playback zone may include an acoustic characteristic of the playback zone. In another example, the one or more characteristics of the playback zone may include a dimension of the playback zone, a flooring material of the playback zone, a wall material of the playback zone, an intended use of the playback zone, an number of furniture in the playback zone, a size of furniture in the playback zone, and types of furniture in the playback zone, among other possibilities.

In one example, referring again to FIG. 8, playback device 804 may be calibrated for the playback zone 810. As indicated above, method 1100 may be performed, either individually or collectively by the playback device 804 being calibrated, the playback device 806, the controller device 808, the computing device 802, or another device in communication with the playback device 804.

In one case, the one or more characteristics may include an acoustic characteristic of the playback zone 810. In such a case, the playback device 804 in the playback zone 810 may play a first audio signal and detect by a microphone of the playback device 804, a second audio signal that includes a portion corresponding to the first audio signal. In one instance, the data indicating the one or more characteristics may be data indicating the detected second audio signal. In another instance, based on the detected second audio signal and an acoustic characteristic of the playback device 804, the acoustic characteristic of the playback zone 810 may be determined, similar to that discussed previously. The data indicating the one or more characteristics may then indicate the acoustic characteristic of the playback zone. In either instance, data indicating the one or more characteristics may then be received by at least one of the one or more devices performing the method 1100.

In another case, the one or more characteristics may include a dimension of the playback zone, a flooring material of the playback zone, and a wall material of the playback zone etc. In such a case, a user may be prompted via a controller interface provided by a controller device such as the controller device 808, to enter or select one or more characteristics of the playback zone 810. For instance, the controller interface may provide a list of playback zone dimensions, and/or a list of furniture arrangements, among other possibilities for the user to select from. The data indicating the one or more characteristics of the playback zone 810, as provided by the user, may then be received by at least one of the one or more devices performing the method 1100.

At block 1106, the method 1100 involves based on the data, identifying in the database, an audio processing algorithm. Referring to the case where the one or more characteristics include the acoustic characteristic of the playback zone 810, an audio processing algorithm may be identified in the database based on the acoustic characteristics of the playback zone 810. For instance, referring to the database 600 of FIG. 6A, if the received data indicates an acoustic characteristic of the playback zone 810 as $h_{room}^{-1}(t)$–3, or substantially the same as $h_{room}^{-1}(t)$–3, then the audio processing algorithm of database entry 606 having coefficients $w_3$, $x_3$, $y_3$, and $z_3$ may be identified. In the instance the data indicating the one or more characteristics of the playback zone simply includes data indicating the detected second audio signal, the acoustic characteristic of the playback zone may further be determined as described previously, prior to identifying the audio processing algorithm. Other examples are also possible.

Referring to a case where the one or more characteristics include dimensions of the playback zone, among other characteristics, an audio processing algorithm may be identified in the database based on the dimensions of the playback zone. For instance, referring to the database 650 of FIG. 6B, if the received data indicates dimensions of the playback zone 810 as $a_4 \times b_4 \times c_4$, or substantially the same as $a_4 \times b_4 \times c_4$, then the audio processing algorithm of database entry 658 having coefficients $w_4$, $x_4$, $y_4$, and $z_4$ may be identified. Other examples are also possible.

In some cases, more than one audio processing algorithm may be identified based on the one or more characteristics of the playback zone indicated in the received data. For instance, the acoustic characteristic of the playback zone 810 may be determined as $b_{room}^{-1}(t)$–3, which corresponds to audio processing algorithm parameters $w_3$, $x_3$, $y_3$, and $z_3$, as provided in entry 656 of the database 650 of FIG. 6, while the dimensions provided by the user for the playback zone 810 may be $a_4 \times b_4 \times c_4$, which corresponds to audio processing algorithm parameters $w_4$, $x_4$, $y_4$, and $z_4$, as provided in entry 658.

In one example, the audio processing algorithm corresponding to a matching or substantially matching acoustic characteristic may be prioritized. In another example, an average of the audio processing algorithms (i.e. an averaging of the parameters) may be calculated, and the average audio processing algorithm may be the identified audio processing algorithm. Other examples are also possible.

At block 1108, the method 1100 involves transmitting data indicating the identified audio processing algorithm. Continuing with the examples above, the data indicating the identified audio processing algorithm may be transmitted to the playback device 804 being calibrated for the playback zone 810. In one case, the data indicating the identified audio processing algorithm may be transmitted directly to the playback device 804. In another case, such as if the calibration of the playback device 804 is coordinated by the controller device 808, and if the audio processing algorithm was identified by the computing device 802, the data indicating the identified audio processing algorithm may be transmitted to the playback device 804 from the computing device 802 via the controller device 808. Other examples are also possible.

As indicated above, the functions of method 1100 may be performed by one or more of one or more servers, one or more playback devices, and/or one or more controller devices. In one example, maintenance of the database at block 1102 may be performed by the computing device 802, and receiving of data indicating the one or more characteristics of the playback zone at block 1104 may be performed by the controller device 808 (the data may be provided to the controller device 808 by the playback device 804 being calibrated in the playback zone 810). Block 1106 may be performed by the controller device 808 communicating with the computing device 802 to access the database maintained by the computing device 802 to identify the audio signal processing, and block 1108 may involve the computing device 802 transmitting the data indicating the identified audio processing algorithm to the playback device 804 either directly or via the controller device 808.

In another example, the functions of method 1100 may be performed wholly or substantially wholly by one device. For instance, the computing device 802 may maintain the database as discussed in connection to block 1102.

The computing device 802 may then coordinate calibration of the playback device 804. For instance, the computing device 802 may cause the playback device 804 to play a first audio signal and detect a second audio signal, receive from the playback device 804 data indicating the detected second audio signal, and determine an acoustic characteristic of the playback zone 810 based on the data from the playback device 804. In another instance, the computing device 802 may cause the controller device 808 to prompt a user to provide one or more characteristics of the playback zone 810 (i.e. dimensions etc., as discussed above) and receive data indicating the user-provided characteristics of the playback zone 810.

The computing device may then, at block 1106 identify an audio processing algorithm based on the received data, and at block 1108, transmit data indicating the identified audio processing algorithm to the playback device 804. The computing device 802 may also transmit a command for the playback device 804 to apply the identified audio processing algorithm when playing audio content in the playback zone 810. Other examples are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A computing device comprising:
a processor; and
memory having stored thereon instructions executable by the processor to cause the computing device to perform functions comprising:
causing a first playback device in a first playback zone to play a first audio signal;
receiving data indicating a second audio signal detected by a microphone, wherein the second audio signal comprises a portion corresponding to the first audio signal played by the first playback device;
based on (i) the second audio signal, (ii) a characteristic of the microphone, and (iii) a characteristic of the first playback device, determining a particular acoustic characteristic of the first playback zone by removing the characteristics of the microphone and the characteristic of first playback device from the second audio signal;
based on the particular acoustic characteristic and a predetermined audio characteristic, determining an audio processing algorithm, wherein application of the determined audio processing algorithm to a second playback zone modifies playback of audio content by a second playback device in the second playback zone to have the predetermined audio characteristic, wherein the second playback zone was determined to have the particular acoustic characteristic; and
causing to be stored in a database, an association between the determined audio processing algorithm and the particular acoustic characteristic of the first playback zone.

2. The computing device of claim 1, wherein applying the determined audio processing algorithm by the first playback device when playing the first audio signal in the first playback zone produces a third audio signal having an audio characteristic that is the same as the predetermined audio characteristic.

3. The computing device of claim 1, wherein the audio processing algorithm is a first audio processing algorithm, and wherein the functions further comprise:
causing a third playback device in a third playback zone to play a third audio signal;
receiving data indicating a fourth audio signal detected by a microphone, wherein the fourth audio signal comprises a portion corresponding to the third audio signal played by the third playback device;
based on the fourth audio signal and a characteristic of the third playback device, determining an acoustic characteristic of the third playback zone;
based at least on the acoustic characteristic of the third playback zone, determining a second audio processing algorithm; and
causing to be stored in the database, an association between the second audio processing algorithm and the acoustic characteristic of the third playback zone.

4. The computing device of claim 3, wherein applying the first audio processing algorithm by the first playback device when playing the first audio signal in the first playback zone produces a fifth audio signal having an audio characteristic that is the same as the predetermined audio characteristic, and wherein applying the second audio processing algorithm by the third playback device when playing the third audio signal in the third playback zone produces a sixth audio signal having an audio characteristic that is the same as the predetermined audio characteristic.

5. The computing device of claim 3, wherein the functions further comprise:
determining that the acoustic characteristic of the third playback zone is the same as the particular acoustic characteristic of the first playback zone;
responsively, determining a third audio processing algorithm based on the first audio processing algorithm and the second audio processing algorithm; and
causing to be stored in the database, an association between the third audio processing algorithm and the particular acoustic characteristic of the first playback zone.

6. The computing device of claim 1, wherein determining the audio processing algorithm comprises:
determining one or more parameters for the audio processing algorithm.

7. The computing device of claim 1, wherein the functions further comprise:
receiving data indicating one or more characteristics of the first playback zone; and
causing to be stored in the database, an association between the one or more characteristics of the first playback zone and the audio processing algorithm.

8. The computing device of claim 7, wherein the one or more characteristics of the first playback zone comprises one or more of: (a) a dimension of the first playback zone, (b) an audio reflectivity characteristic of the first playback zone (c) an intended use of the first playback zone, (d) a number of furniture in the first playback zone, (e) size of furniture in the first playback zone, and (f) types of furniture in the first playback zone.

9. Tangible, non-transitory computer-readable medium having stored thereon instructions executable by one or more processors to cause a computing device to perform functions comprising:
causing a first playback device in a first playback zone to play a first audio signal;
receiving (i) data indicating one or more characteristics of the first playback zone, and (ii) data indicating a second audio signal detected by a microphone, wherein the second audio signal comprises a portion corresponding to the first audio signal played by the first playback device;
based on the (i) second audio signal, (ii) a characteristic of the microphone, and (iii) a characteristic of the first playback device, determining a particular acoustic characteristic of the first playback zone by removing the characteristics of the microphone and the characteristic of the first playback device from the second audio signal;
based on the particular acoustic characteristic and a predetermined audio characteristic, determining an audio processing algorithm, wherein application of the determined audio processing algorithm to a second playback zone modifies playback of audio content by a second playback device in the second playback zone to have the predetermined audio characteristic, wherein the second playback zone was determined to have the particular acoustic characteristic; and causing to be stored in a database, an association between the determined audio processing algorithm and at least one of the one or more characteristics of the first playback zone.

10. The tangible, non-transitory computer-readable medium of claim 9, wherein the audio processing algorithm is a first audio processing algorithm, and wherein the functions further comprise:
causing a third playback device in a third playback zone to play a third audio signal;
receiving data indicating a fourth audio signal detected by a microphone, wherein the fourth audio signal comprises a portion corresponding to the third audio signal played by the third playback device of the third playback zone;
based on the fourth audio signal and a characteristic of the third playback device, determining a second audio processing algorithm; and
cause to be stored in the database, an association between the second audio processing algorithm and at least one of the one or more characteristics of the third playback zone.

11. The tangible, non-transitory computer-readable medium of claim 10, wherein the functions further comprise:
determining that an acoustic characteristic of the third playback zone is the same as the particular acoustic characteristic of the first playback zone;
responsively, determining a third audio processing algorithm based on the first audio processing algorithm and the second audio processing algorithm; and
causing to be stored in the database, an association between the third audio processing algorithm and the particular acoustic characteristic of the first playback zone.

12. The tangible, non-transitory computer-readable medium of claim 9, wherein the one or more characteristics of the first playback zone comprises one or more of the following: (a) a dimension of the first playback zone, (b) an audio reflectivity characteristic of the first playback zone (c) an intended use of the first playback zone, (d) a number of furniture in the first playback zone, (e) size of furniture in the first playback zone, (f) types of furniture in the first playback zone, and (g) an acoustic characteristic of the first playback zone.

13. A computing device comprising:
a processor; and
memory having stored thereon instructions executable by the processor to cause the computing device to perform functions comprising:
receiving, (i) a plurality of audio processing algorithms determined based on respective playback zone characteristics of multiple playback zones, and (ii) a plurality of playback zone characteristics;
maintaining a database of (i) the plurality of audio processing algorithms and (ii) the plurality of playback zone characteristics, wherein each audio processing algorithm of the plurality of audio processing algorithms corresponds to at least one playback zone characteristic of the plurality of playback zone characteristics, and wherein application of a given audio processing algorithm in the database to a first playback zone modifies playback of audio content in the first playback zone having at least one of the corresponding playback zone characteristics to have a predetermined acoustic characteristic;
receiving data indicating one or more characteristics of a second playback zone of a playback device;
based on the data, identifying, in the database, an audio processing algorithm corresponding to the one or more characteristics of the second playback zone; and
transmitting to the playback device, data indicating the identified audio processing algorithm to cause the playback device to apply the identified audio processing algorithm when playing audio content in the second playback zone such that playback of audio content in the second playback zone has the same predetermined acoustic characteristic.

14. The computing device of claim 13, wherein the data further indicates an audio signal detected by a microphone of the playback device in the second playback zone.

15. The computing device of claim 14, wherein identifying in the database, the audio processing algorithm, further comprises:
determining an acoustic characteristic of the second playback zone based on the detected audio signal and a characteristic of the playback device; and
identifying in the database, an audio processing algorithm based on the determined acoustic characteristic of the second playback zone.

16. The computing device of claim 13, wherein the one or more characteristics of the second playback zone of the playback device comprises one or more of the following: (a) a dimension of the second playback zone, (b) an audio reflectivity characteristic of the second playback zone (c) an intended use of the second playback zone, (d) a number of furniture in the second playback zone, (e) size of furniture in the second playback zone, (f) types of furniture in the second playback zone, and (g) an acoustic characteristic of the second playback zone.

17. The computing device of claim 13, wherein the data indicating one or more characteristics of the second playback zone is received from a controller device.

18. The computing device of claim 13, wherein the data indicating one or more characteristics of the second playback zone is received from the playback device in the second playback zone.

19. The tangible, non-transitory computer-readable medium of claim 9, wherein determining the audio processing algorithm comprises:
determining one or more parameters for the audio processing algorithm.

20. The tangible, non-transitory computer-readable medium of claim 9, wherein applying the determined audio processing algorithm by the first playback device when playing the first audio signal in the first playback zone produces a third audio signal having an audio characteristic that is the same as the predetermined audio characteristic.

* * * * *